United States Patent
Gustavsson et al.

(10) Patent No.: US 12,018,835 B2
(45) Date of Patent: Jun. 25, 2024

(54) BIOMASS UPGRADING SYSTEM

(71) Applicant: BioShare AB, Karlstad (SE)

(72) Inventors: Christer Gustavsson, Karlstad (SE);
Anton Larsson, Gothenburg (SE);
Martin Seemann, Gothenburg (SE);
Henrik Thunman, Partille (SE); David Pallarès, Gothenburg (SE); Henrik Ström, Stenungsund (SE); Lars Stigsson, Bjärred (SE)

(73) Assignee: BioShare AB, Karlstad (SE)

( * ) Notice: Subject to any disclaimer, the term of this patent is extended or adjusted under 35 U.S.C. 154(b) by 668 days.

(21) Appl. No.: 16/973,814

(22) PCT Filed: Jun. 7, 2019

(86) PCT No.: PCT/IB2019/054766
§ 371 (c)(1),
(2) Date: Dec. 10, 2020

(87) PCT Pub. No.: WO2019/239270
PCT Pub. Date: Dec. 19, 2019

(65) Prior Publication Data
US 2021/0180787 A1    Jun. 17, 2021

(30) Foreign Application Priority Data

Jun. 11, 2018 (WO) ............... PCT/IB2018/054187
Jun. 11, 2018 (WO) ............... PCT/IB2018/054189
Dec. 9, 2018 (WO) ............... PCT/IB2018/059806

(51) Int. Cl.
*F23C 10/10* (2006.01)
*B01J 8/18* (2006.01)
(Continued)

(52) U.S. Cl.
CPC ............. *F23C 10/10* (2013.01); *B01J 8/1809* (2013.01); *B01J 8/1818* (2013.01); *B01J 8/1827* (2013.01);
(Continued)

(58) Field of Classification Search
CPC . C10J 3/48; F23C 10/005; F23C 10/06; F23C 10/30; F23C 10/20; F23C 2206/102; F23C 2900/10005
See application file for complete search history.

(56) References Cited

U.S. PATENT DOCUMENTS 2,656,258 A    10/1953    Fred et al.
4,102,773 A    7/1978    Green et al.
(Continued)

FOREIGN PATENT DOCUMENTS

CN    109945172 B    9/2020
EP    0 597 683 A2    5/1994
(Continued)

OTHER PUBLICATIONS

U.S. Appl. No. 16/620,510, Ström, Henrik, Recovery of Chemicals from Fuel Streams, filed Jun. 2, 2022; Dec. 8, 2019 Sep. 9, 2022.
(Continued)

*Primary Examiner* — David J Laux
(74) *Attorney, Agent, or Firm* — Bresbo AB

(57) ABSTRACT

Aspects provide for volatilizing a biomass-based fuel stream, removing undesirable components from the resulting volatiles stream, and combusting the resulting stream (e.g., in a kiln). Removal of particles, ash, and/or H2O from the volatiles stream improves its economic value and enhances the substitution of legacy (e.g., fossil) fuels with biomass-based fuels. Aspects may be particularly advantageous for upgrading otherwise low-quality biomass to a fuel specification sufficient for industrial implementation. A vola-
(Continued)

tilization reactor may include a fluidized bed reactor, which may comprise multiple stages and/or a splashgenerator. A splashgenerator may impart directed momentum to a portion of the bed to increase bed transport via directed flow.

19 Claims, 5 Drawing Sheets

(51) Int. Cl.
| | |
|---|---|
| *B01J 8/24* | (2006.01) |
| *B01J 8/26* | (2006.01) |
| *B01J 8/34* | (2006.01) |
| *B01J 8/36* | (2006.01) |
| *C10J 3/48* | (2006.01) |
| *C10J 3/72* | (2006.01) |
| *F15D 1/00* | (2006.01) |
| *F22B 31/00* | (2006.01) |
| *F23C 10/00* | (2006.01) |
| *F23C 10/06* | (2006.01) |
| *F23C 10/20* | (2006.01) |
| *F23C 10/28* | (2006.01) |
| *F23C 10/30* | (2006.01) |

(52) U.S. Cl.
CPC ............ *B01J 8/1836* (2013.01); *B01J 8/26* (2013.01); *B01J 8/34* (2013.01); *B01J 8/36* (2013.01); *C10J 3/48* (2013.01); *C10J 3/482* (2013.01); *C10J 3/723* (2013.01); *F15D 1/00* (2013.01); *F23C 10/005* (2013.01); *F23C 10/06* (2013.01); *F23C 10/30* (2013.01); *B01J 8/24* (2013.01); *B01J 2208/00539* (2013.01); *B01J 2208/00566* (2013.01); *B01J 2208/00849* (2013.01); *B01J 2208/00902* (2013.01); *B01J 2208/00938* (2013.01); *C10J 2200/09* (2013.01); *C10J 2200/152* (2013.01); *C10J 2300/0916* (2013.01); *C10J 2300/0956* (2013.01); *C10J 2300/0959* (2013.01); *C10J 2300/0976* (2013.01); *C10J 2300/1637* (2013.01); *F22B 31/0092* (2013.01); *F23C 10/20* (2013.01); *F23C 10/28* (2013.01); *F23C 2206/101* (2013.01); *F23C 2206/102* (2013.01); *F23C 2900/06041* (2013.01); *F23C 2900/10005* (2013.01)

(56) References Cited

U.S. PATENT DOCUMENTS

| | | | | |
|---|---|---|---|---|
| 4,205,962 | A * | 6/1980 | Marion | C10J 3/74 |
| | | | | 48/212 |
| 4,225,415 | A | 9/1980 | Mirza et al. | |
| 4,588,418 | A * | 5/1986 | Gabler | C10J 3/84 |
| | | | | 252/373 |
| 4,682,986 | A * | 7/1987 | Lee | C10J 3/482 |
| | | | | 48/197 R |
| 4,823,712 | A | 4/1989 | Wormer | |
| 4,828,486 | A | 5/1989 | Sakamoto et al. | |
| 5,961,786 | A | 10/1999 | Freed et al. | |
| 6,530,978 | B2 | 3/2003 | McQuigg et al. | |
| 7,214,252 | B1 | 5/2007 | Krumm | |
| 8,500,959 | B2 | 8/2013 | Lehto | |
| 9,580,657 | B2 | 2/2017 | Heydenrych et al. | |
| 2006/0000143 | A1 | 1/2006 | Nagato et al. | |
| 2006/0137579 | A1 | 6/2006 | Fujimura et al. | |
| 2007/0014704 | A1 | 1/2007 | Hashimoto et al. | |
| 2007/0283902 | A1 * | 12/2007 | Maryamchik | F23C 10/18 |
| | | | | 122/4 D |
| 2009/0065437 | A1 * | 3/2009 | Mohedas | B03C 1/02 |
| | | | | 210/695 |
| 2010/0024297 | A1 | 2/2010 | Suda et al. | |
| 2010/0139534 | A1 * | 6/2010 | Tsantrizos | C10K 1/20 |
| | | | | 110/235 |
| 2011/0042277 | A1 * | 2/2011 | Briens | B03B 5/623 |
| | | | | 209/12.1 |
| 2011/0073049 | A1 * | 3/2011 | Maryamchik | F23C 10/24 |
| | | | | 122/4 D |
| 2011/0219680 | A1 * | 9/2011 | Wilkomirsky Fuica | B01J 8/28 |
| | | | | 44/605 |
| 2012/0297773 | A1 * | 11/2012 | Prabhu | F02C 3/30 |
| | | | | 48/128 |
| 2013/0064722 | A1 * | 3/2013 | Lankinen | F23C 10/10 |
| | | | | 422/146 |
| 2013/0087084 | A1 * | 4/2013 | Sato | F23G 5/085 |
| | | | | 110/218 |
| 2014/0102342 | A1 * | 4/2014 | Maryamchik | F23C 10/10 |
| | | | | 431/12 |
| 2015/0118723 | A1 | 4/2015 | Duzoglou | |
| 2015/0329358 | A1 * | 11/2015 | Konda | C10J 3/52 |
| | | | | 422/162 |
| 2016/0130503 | A1 | 5/2016 | Heydenrych | |
| 2016/0214893 | A1 * | 7/2016 | Komatsu | C04B 7/4407 |
| 2016/0290632 | A1 * | 10/2016 | Pohl | F23C 10/005 |
| 2017/0120211 | A1 * | 5/2017 | Adham | B01J 8/226 |
| 2017/0189877 | A1 | 7/2017 | Abdullah et al. | |
| 2019/0048273 | A1 | 2/2019 | Verberne et al. | |

FOREIGN PATENT DOCUMENTS

| | | |
|---|---|---|
| EP | 1 043 385 A1 | 10/2000 |
| EP | 2 428 546 A1 | 3/2012 |
| EP | 3 287 197 A1 | 2/2018 |
| FI | 112087 B | 12/2001 |
| FR | 2.203.964 | 5/1974 |
| GB | 1 508 777 A | 4/1978 |
| JP | 2006132885 | 5/2006 |
| JP | 2016 138694 A | 8/2016 |
| WO | WO 2010/139854 A1 | 12/2010 |
| WO | WO 2011/0454473 A1 | 4/2011 |
| WO | WO2020/169888 A1 | 8/2020 |

OTHER PUBLICATIONS

U.S. Appl. No. 17/251,242, Pallarès, David, Srpay, Jet, and/or Splash Induced Circulation Among Integrated Bubbling Zones in a Bubbling Fluidized Bed Reactor, filed Dec. 11, 2020.
English translation of CN 109945172, cited in Swedish patent application No. 2230025-5 (Sep. 4, 2020).
Office action issued by the Swedish patent office in Swedish patent application No. 2230025-5 (Sep. 2022).
2nd Office action issued by the Swedish Patent Office in Swedish patent application No. 2030362-4 Dec. 2022.
U.S. Appl. No. 17/251,242, Pallarès, David, Srpay, Jet, and/or Splash Induced Circulation, filed Dec. 11, 2020.
U.S. Appl. No. 16/620,510, Ström, Henrik, Recovery of Chemicals from Fuel, filed Dec. 8, 2019, Jun. 2, 2022.
"Added value from biomass by broader utilization of fuels and CHP plants," Gustavsson, Christer; Doctoral Thesis, Karlstad University, Dec. 2016.
"Biomass pyrolysis for liquid biofuels: production and use" Rizzo, Andrea Maria; Doctoral Thesis, University of Florence, Dec. 2014.
"Challenges and opportunities with an industrial-scale integrated bio-oil plant" Autio, Joakim et al., IEA Bioenergy Conference, Vienna, Austria (Nov. 2012).
"Control of the solids retention time by multi-staging a fluidized bed reactor," Zhao, Ke et al; Fuel Processing Technology 167, 171-182 (Jul. 2017).
Office action issued by the Finnish patent office in related application, FI patent application No. 20170148 (Mar. 2018).
English Abstract transation (WIPO) of JP 2006132885, Combustion Method and Device for Wet Waste, (May 2006).
Machine translation of JP 2006132885, Combustion Method and Device for Wet Waste, (May 2006).

(56) References Cited

OTHER PUBLICATIONS

Response to Office action issued by the Finnish patent office in related application, FI patent application No. 20170148 (Jun. 2018).
International Search Report, Written Opinion, and Search Strategy for related application PCT/IB2018/054187 Dec. 2018.
Response to ISR/WO in PCT/IB2018/054187) filed with entry into the European regional phase for European patent application No. 1873 9642.9 Jan. 2020.
1st Office action issued by the European Patent Office in European patent application No. 1873 9642.9 Feb. 2021.
Response to 1st office action issued by the European Patent Office in European patent application No. 1873 9642.9 Jun. 2021.
2nd Office action issued by the European Patent Office in European patent application No. 1873 9642.9 Aug. 2021.
Response to 2nd office action issued by the European Patent Office in European patent application No. 1873 9642.9 Feb. 2022.
1st Office action issued by the Swedish Patent Office in Swedish patent application No. 2030005-9 Aug. 2020.
Response to 1st Office action issued by the Swedish Patent Office in Swedish patent application No. 2030005-9 Feb. 2021.
Supplemental response to 1st Office action issued by the Swedish Patent Office in Swedish patent application No. 2030005-9 Oct. 2021.
International Search Report, Written Opinion, and Search Strategy for related application PCT/IB2018/054189 Dec. 2018.
International Search Report, Written Opinion, and Search Strategy for related application PCT/IB2018/059806 Dec. 2019.
Response to ISR/WO in PCT/IB2018/059806) filed with entry into the European regional phase for European patent application No. 1883 0946.2 Dec. 2020.
1st Office action issued by the European Patent Office in European patent application No. 18 830 946.2 Aug. 2021.
Response to 1st Office action issued by the European Patent Office in European patent application No. 18 830 946.2 Dec. 2021.
1st Office action issued by the Swedish Patent Office in Swedish patent application No. 2030362-4 Sep. 2021.
Response to 1st Office action issued by the Swedish Patent Office in Swedish patent application No. 2030362-4 Jan. 2022.
International Search Report, Written Opinion, and Search Strategy for related application PCT/IB2019/054766 Dec. 2019.
Response to ISR/WO in PCT/IB2019/054766 filed with entry into the European regional phase for European patent application No. 1974 2914.5 Dec. 2020.
1st Office action issued by the Swedish Patent Office in Swedish patent application No. 2030363-2 Sep. 2021.
Response to 1st Office action issued by the Swedish Patent Office in Swedish patent application No. 2030363-2 Mar. 2022.
3rd Office action issued by the Swedish Patent Office in Swedish patent application No. 2030362-4 Mar. 2024.
3rd Office action issued by the Swedish Patent Office in Swedish patent application No. 2030363-2 Mar. 2024.
Response to the 3rd Office action issued by the Swedish Patent Office in Swedish patent application No. 2030362-4 May 2024.
Response to the 3rd Office action issued by the Swedish Patent Office in Swedish patent application No. 2030363-2 May 2024.
Response (inc. claims) to 3rd Office action issued by the European Patent Office in European patent application No. 1873 9642.9 Apr. 2024.

* cited by examiner

BIOMASS UPGRADING SYSTEM

CROSS REFERENCE TO RELATED APPLICATIONS

The present application is the National Phase of PCT application no. PCT/IB2019/054766, filed Jun. 7, 2019, and claims the priority benefit of PCT patent applications no. PCT/IB2018/054187 and PCT/IB2018/054189, each of which was filed Jun. 11, 2018, and PCT/IB2018/059806, filed Dec. 9, 2018, the disclosures of which are incorporated by reference herein.

BACKGROUND

1. Technical Field

The present invention relates generally to upgrading fuels, such as biomass, particularly for use in pyroprocessing.

2. Description of Related Art

For a society seeking to transition from fossil to renewable fuels, the extraction of maximum value from biomass while minimizing aggregate environmental impact becomes increasingly important. Biomass has historically been used for food, construction, heat, and/or for the intrinsic properties of certain chemical components (e.g., cellulose). Over time, the relative economic value of each of these uses rises and falls. Species that were once burned may be redirected to other purposes (e.g., chemical synthesis), necessitating a substitute fuel in the process that was once fired with the biomass.

Tall oil was once considered a byproduct of the kraft process, commonly used to make pulp (e.g., for board, tissue, paper, and the like) in a pulp mill Tall oil has (and continues) to evolve as a source of chemical species, a precursor, and a direct fuel source. As market factors change, the economic value of tall oil changes. A process that previously utilized inexpensive tall oil (e.g., tall oil pitch) may be "priced out" by increasing demand, requiring a substitute.

A variety of industrial processes utilize pyroprocessing to react a substance with a high temperature gas to transform the substance in some way. A roaster, smelter, furnace, and the like (hereinafter: kiln) is used to "fire" the substance at high temperatures in a desired atmosphere. Certain kilns fire substantially granular or particulate substances (e.g., cement kilns, lime kilns, smelters, roasters). In contrast to combustion purely for heat generation (e.g., to heat a gas or other working fluid), such pyroprocessing operations may combine intimate mixing between a fuel phase (e.g., a condensed fuel), a condensed substance to be reacted, and an oxidizing, inert, and/or reducing gas. A smelter may heat a mixture of coke and iron ore to reduce the ore to metallic iron.

Such pyroprocessng operations typically require fuel with specific properties; many have evolved to burn petrochemicals such as coal or natural gas. Such processes may be incompatible with the water content, ash content, salts, acids, and/or molecular weight diversity (from small molecules through cellulose) common to biomass. Such industries would benefit from a process to upgrade a low-value biomass into a species that readily integrates into an existing process. For a particular pyroprocessing reaction requiring certain fuel properties, the ability to "upgrade" biomass to a fuel having those desired properties would enable the substitution of petrochemical fuels with renewable biomass.

SUMMARY

Aspects provide for the volatilization of an input fuel (e.g., biomass) to create a fuel stream comprising a gaseous fuel (e.g., permanent gases, volatilized liquids) and a condensed fuel (e.g., polyaromatics, high MW organics, tars, rosins, and the like). The fuel streams may be used together or separately. Separation of the fuel streams may facilitate handling of the streams using corresponding gas or liquid handling apparatus. Such separated streams may be handled more efficiently than a mixed stream (requiring multiphase apparatus configured to handle mixtures of gas and liquid phases). A volatiles stream resulting from volatilization of an incoming fuel may be separated (e.g., to remove particles, H2O, and/or other components) in a manner that "upgrades" the fuel for use in pyroprocessing. Certain pyroprocessing operations are tolerant of some contaminants (e.g., sulfur) and/or include mitigation measures for other contaminants (e.g., NOx). An overall system efficiency may be improved by using a separator that is adapted to both the fuel stream and the pyroprocessing utilization (e.g., removing only those species not tolerated by the pyroprocessing). For example, an inbound fuel stream containing sulfur (e.g., certain biomass, coal) may be upgraded for use in a kiln that is tolerant of sulfur. A separator upgrading the inbound fuel might remove unwanted species (e.g., alkalines, Phosphorous, silicon, aluminum,) yet allow tolerable species (e.g., sulfur). A pyroprocessing apparatus that already includes NOx abatement technology may be tolerant of inbound Nitrogen species, and so the separator need not remove these species. By designing a separator that matches the inbound fuel source, and the requirements of the pyroprocessing reaction, and the capabilities/tolerances of the pyroprocessing system, an aggregate system efficiency may be improved at reduced capital and/or operational expense. As a result, overall environmental impact may be reduced.

A separator separates out undesirable residue, upgrading the fuel into high quality gaseous and/or liquid fuels. Particles (e.g., comprising inorganic elements that yield ash), salt-components (e.g., halides) and/or other species deleterious to subsequent combustion may be removed. Separation and segregation of tars and other heavy organics may reduce clogging and fouling of equipment. Upgrading biomass may enhance the substitution of fossil fuel combustion (e.g., natural gas) with a biomass-based fuel.

Combustion of such upgraded, biomass-derived fuel (particularly condensed fuel) may result in surprising enhancement of certain combustion processes, particularly pyroprocessing operations (e.g., firing substances in a kiln, smelter, roaster, and the like, herein: kiln). Fuel, such as biomass-derived condensed fuel, cleaned of residue (e.g., ash, solids) may be fired in a kiln to yield a relatively lower frequency radiant energy (e.g., increased infrared) as compared to prior fuels at equivalent heat output, yet not contaminate the fired substance with undesirable residue from the biomass. An improved absorption of combustion energy by the fired substance may increase the efficiency of certain pyroprocessing apparatus. Certain biomass components may be particularly effective during firing operations involving intimate mixing of fuel, oxidant, and a particulate/granular substance being reacted, such as in a lime kiln or a cement kiln. As a result, the environmental impact of industrial processes such as pulping, cement making, steelmaking, and the like may be reduced.

Various aspects provide for a separator having two or more (including three or more) discrete separation apparatus and configured to separate a residue from a volatiles stream (e.g., from volatilization of biomass). A separator may be implemented separately from a kiln and/or separately from a volatilization reactor. A separator typically comprises a plurality of separation apparatus arranged in series and in parallel, such that individual streams may be separated and upgraded using apparatus specifically designed for such streams (gas vs. liquid, high vs. low viscosity, physical vs. chemical separation, multiphase vs. single phase). A separator may comprise a sequence of heat exchangers and filters configured to separate an inbound volatiles stream into permanent gases, light organics (e.g., suitable as a quench liquid), and heavy tars, while removing undesirable residue (e.g., solid particles, excess H2O, and possibly CO2).

A method may comprise receiving a fuel comprising biomass, volatilizing the fuel with an inert, reducing, and/or mildly oxidizing, gas to yield a volatiles stream, and separating out an undesirable residue from the volatiles stream to yield an upgraded fuel stream (e.g., at least one of a gaseous and condensed, such as liquid, fuel). The upgraded fuel stream may be delivered to a combustor (e.g., a kiln, such as a lime kiln) that combusts the upgraded fuel stream (e.g., to fire a substance). An upgraded fuel stream may comprise one or both of a gaseous and a condensed phase, which may be delivered mixed (e.g., multiphase). A stream may be separated into a gaseous and a condensed (e.g., liquid) phase, which may both be delivered for combustion (e.g., with metering to control their relative amounts). An amount of particles in the volatiles stream may be reduced (e.g., substantially eliminated), which may reduce downstream fouling and/or the subsequent contamination of certain combustion processes. An amount of H2O and/or CO2 in the volatiles stream may be reduced, which may increase the heating efficiency of a subsequent combustion process. The fired substance may comprise a carbonate, such as CaCO3, which may be charged into and fired in a lime kiln with the upgraded fuel stream (e.g., biomass-based) to produce lime. The lime may be mixed with an aqueous solution (e.g., comprising smelt from a recovery boiler coupled to a pulp mill) to precipitate a carbonate from the solution. The precipitated carbonate may be returned (e.g., recycled) to the lime kiln, where it is fired in a subsequent operation to produce lime. An oxidant used for combustion may be enriched in oxygen content (e.g., oxygen-enriched air, or even substantially pure oxygen. A kiln (e.g., a lime kiln) may combust an upgraded fuel stream with the oxygen-enriched oxidant to fire the substance. Aspects may comprise reducing and/or removing an amount of CO2 in a stream, particularly a gas stream used for subsequent combustion.

In some cases, the volatiles stream is separated into a gaseous fuel and a condensed fuel, at least one of which (including both) is delivered to the combustor. In an implementation, a volatiles stream is separated into gaseous and condensed fuels, each of which is delivered to a mixer coupled to a kiln. The mixer is configured to control the ratio of gaseous to condensed fuel (e.g., while maintaining a desired level of inbound heating energy delivered to the kiln) Certain combustion operations may be enhanced by enriching the oxygen concentration of the oxidant (e.g., air) and/or correspondingly reducing an amount of nitrogen in the oxidant. The combustion of oxygen-enriched air (or even substantially pure oxygen, e.g., oxyfuel combustion) with the upgraded, biomass-based fuel may result in surprisingly efficient heat utilization, particularly for pyroprocessing.

A fluidized bed reactor (e.g., a volatilization stage) may comprise a gaswall configured to separate the gas phase above a bed into two parts, and/or a bedwall configured to separate the bed into two parts, and/or a splashgenerator configured to generate a splashzone comprising conveyed solids. The splashgenerator typically comprises a transport gas supply configured to supply a transport gas (to generate the splash) and/or a plurality of directed, high velocity nozzles. The splashgenerator is configured to inject high velocity gas with sufficient momentum to "splash" or "spray" the solids (and material entrained within) from one region to another. A splashgenerator may impart directed momentum to a portion of the bed to increase bed transport via directed flow. A splashgenerator may be configured to impart sufficient momentum to the solids to propel them over a distance that is at least 20 cm, including at least 40 cm, including at least 80 cm, including over 1 meter.

DETAILED DESCRIPTION

Various aspects describe a fuel stream processing system configured to separate out a residue from one or more components of a fuel stream, such as a volatiles stream. The system may be used to provide fuel to a process, such as a pyroprocessing apparatus (a kiln, furnace, and/or other high temperature reactor) configured to fire a substance (typically a granulated or particulate solid phase) at high temperature to react the substance. By upgrading a relatively inexpensive fuel (e.g., biomass) to yield a high-quality fuel having well defined characteristics, the system may enhance the substitution of expensive and/or fossil fuels with renewable biomass-based fuels. Certain pyroprocessing operations may benefit from an upgraded condensed fuel comprising tars, soot, and the like, whose combustion results in a spectrum of emitted radiation that is particularly effective at heating the processed substance. Some carbonates, sulfates, and/or hydroxides may be particularly absorptive of the radiative frequencies resulting from the combustion of certain fuels—they "match" the combustive properties of the fuel, particularly a biomass-based condensed fuel. In the kiln, commingled particles (e.g., combusting droplets of upgraded fuel and the granulated substance being fired) may yield increased convective and/or conductive heat transfer. By removing undesirable residue with a separator, this "matched" fuel stream may be advantageously used by the corresponding kiln. For a typical lime kiln (e.g., 10-40 MW, including 20-30 MW), such a process may enable largescale substitution of a "less desirable" fuel with a fuel based on relatively inexpensive biomass. A fossil fuel may be swapped out for a renewable fuel, reducing carbon intensity. A higher value fuel (e.g., tall oil, tall oil pitch) may be replaced with a less expensive biofuel.

Figure 1:
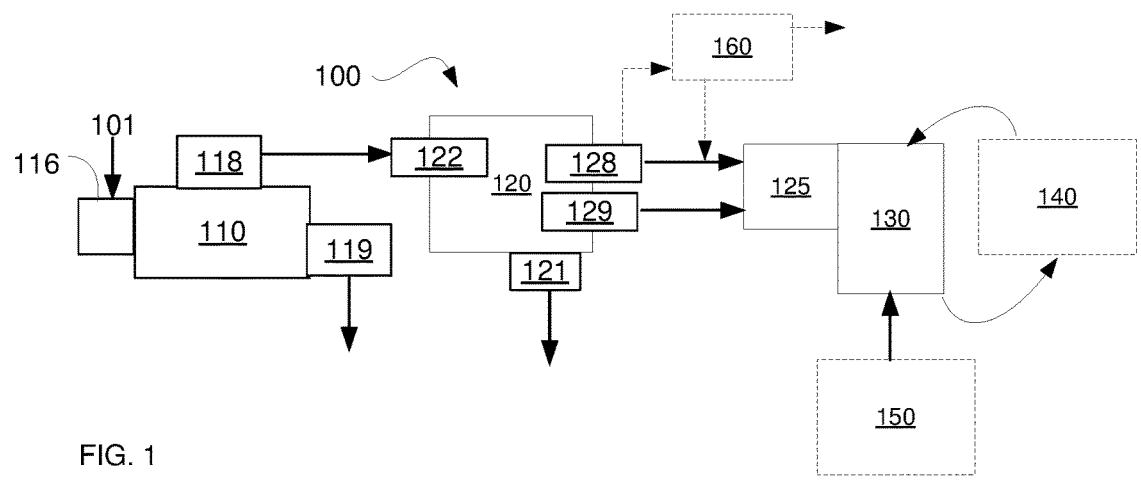
FIG. 1 is a schematic illustration of a fuel upgrading system coupled to a kiln, per an embodiment.

FIG. 1 illustrates a fuel stream processing system coupled to a kiln, per some embodiments. A volatilization reactor 110 having a fuel inlet 116 is configured to receive a fuel 101, which may comprise biomass (e.g., bark, wood chips, bagasse, sawdust, stalks, brush, and the like). A volatilization reactor may be configured to pretreat (e.g., volatilize/gasify/pyrolyze/reform/react, herein: volatilize) a fuel using an inert and/or relatively mildly oxidizing or reducing gas to yield a volatiles stream and a char stream. A volatiles stream typically comprises some solid particles (typically removed), H2O (which is often removed/reduced) and fuel compounds (which are typically separated into gaseous and condensed fuels). A volatilization reactor may comprise a fluidized bed reactor (bubbling and/or circulating), and/or a fixed bed gasifier, an entrained-flow gasifier, and the like. A char stream outlet 119 conveys the char stream out of the volatilization reactor (e.g., to a combustion reactor, not shown) where it may be burned or otherwise used (e.g., as coke). A volatiles stream outlet 118 may convey the volatiles stream to an inlet 122 of a separator 120.

Separator 120 separates a residue 121 (e.g., solids, H2O, and/or CO2) from the volatiles stream, yielding a fuel stream comprising gaseous and/or condensed fuels. A gaseous fuel typically comprises permanent gases (e.g., CO, CH4) and/or molecules that are gases at the outlet (although they might condense at low temperatures). Condensed fuel typically comprises relatively larger molecular weight organics (e.g., polyalphaolefins, tars, and the like) that are condensed (typically liquid) at/after the reactor (although they might evaporate or decompose at higher temperatures).

In FIG. 1, separator 120 includes a gas outlet 128 configured to convey gaseous fuel from the separator and a condensed fuel (CF) outlet 129 configured to convey a condensed fuel from the separator. Typically, the gaseous fuel is subsequently processed with gas handling apparatus (e.g., a fan) whereas the condensed fuel is subsequently processed with liquid handling apparatus (e.g., a pump). Separation of these fuel phases may enhance the efficiency of handling of the fuels, although a mixed outlet (e.g., with multiphase flow) may be implemented.

The fuel(s) may be conveyed to a kiln 130 coupled to at least one of the fuel outlets 128/129, where the fuel is used to fire a substance, particularly a substance comprising a carbonate, a sulfate, a hydroxide, and/or an ore (e.g., iron ore, bauxite, and the like). Kiln 130 may be operated as a roaster, a smelter, a cement kiln, a lime kiln (e.g., to fire CaCO3 to form CaO) and the like.

In FIG. 1, both gaseous and condensed fuels are conveyed to kiln 130, and in this case a meter 125 is used to control a ratio of gaseous fuel to condensed fuel used by the kiln Meter 125 may be operated to increase/decrease the relative proportion of gaseous to condensed fuel used to fire kiln 130, which may be used to moderate flame temperature, radiant energy profile (e.g., optical frequency distribution), convection within the kiln, mixing kinetics, combustion kinetics, and the like. The fuels may be injected into a kiln with appropriate (gas or condensed) nozzles. A meter may be used to independently control the injection rates of the gaseous and condensed fuel nozzles.

Kiln 130 may be a component of another industrial process (e.g., steelmaking, cement making, and the like), represented by mill 140. In an embodiment, kiln 130 comprises a lime kiln, and mill 140 comprises a pulp mill (which may or may not be integrated with a paper mill, a tissue mill, a board mill, and the like) typically used in the kraft process. Kiln 130 may combust the biomass-derived gaseous and/or condensed fuels from the separator to provide heat for calcining limestone (CaCO3) to form lime (e.g., quicklime, CaO), which may be used in the recovery process of the pulp mill (e.g., to recover smelt, causticize green liquor, and the like, from a recovery boiler, not shown).

The volatiles stream conveyed to the separator typically comprises a wide range of components, including desirable species and undesirable residue. A biomass-based volatilization stream may comprise H2O, ash (or ash-forming) particles, solid fuel particles, bed solids (if the reactor comprises a fluidized bed), permanent gases, volatile gases (that might condense at a lower temperature), aerosols (e.g., heavy organics, rosin, wax, tar, and the like) that remain condensed, and/or other phases. A subsequent process (e.g., a kiln 130) can typically accept most organic compounds, but might be intolerant of other components (e.g., alkaline metals such as sodium, ash, ash-forming species, and the like). According to the properties of fuel 101 and kiln 130, separator 120 is designed to remove undesirable residue from the incoming fuel and convey the desirable components to the downstream process.

By removing ash, undesirable condensed components (e.g., solids), and typically H2O, the biomass-based fuel stream may be "upgraded" to a specification that is appropriate for the kiln An implementation may enable a pulp mill to fire its lime kiln with relatively inexpensive biomass (e.g., brush, waste paper, sawdust, bark) instead of a fuel with higher intrinsic value (e.g., tall oil pitch) and/or a replacement for a fuel having an undesirably high carbon footprint (e.g., heavy fuel oil, natural gas). An implementation may enable a steel mill to replace coal or natural gas with a biomass-based fuel to roast iron ore.

The combustion properties of certain fractions of biomass (e.g., separated by the separator) may be advantageously utilized in a kiln as a renewable fuel for firing a substance. Combustion kinetics, intermixing of fuel and substance, and radiant energy profiles (generated by burning) are surprisingly efficient for certain biomass-based fuels. By removing particles that may contaminate the kiln (e.g., forming ash) and controlling (e.g., substantially eliminating) water content of the fuel stream, biomass-based gas and/or condensed fuel may significantly increase the efficiency of certain pyroprocessing operations. The substitution of fossil fuel with a renewable fuel may reduce the overall environmental impact of combustion (e.g., pyroprocessing).

A kiln may utilize oxygen enriched combustion, including combustion with substantially pure oxygen. FIG. 1 illustrates an optional oxygen enrichment system 150, in this case coupled to kiln 130. Oxygen enrichment system 150 is configured to enrich the oxygen concentration in the oxidant (typically air) and supply this oxygen-enriched oxidant (e.g., oxygen-enriched air, substantially pure oxygen, and the like) to the kiln to be used to fire the substance. Oxygen enrichment system 150 may be located onsite with the separator and/or kiln; it may be located offsite, and the oxidant transported to the kiln via a pipeline, tanker, and the like. Oxygen enrichment system 150 may comprise any commercial system and may be configured to control the amount of oxygen enrichment (e.g., from mildly enriched air to substantially pure oxygen). Oxygen enrichment system 150 may comprise a pressure swing adsorption system, a fractional distillation system, a membrane system (e.g., ionic transport membrane, oxygen transport membrane) and/or other separation system. The kiln may combust incoming fuel from the separator using oxyfuel combustion. A system may comprise a CO2-reduction system to reduce (e.g., substantially eliminate) a CO2 concentration in a gaseous fuel. In FIG. 1, an optional CO2-reduction system 160 (e.g., an amine-scrubber, a PSA or VSA system, and/or other adsorption system) may be configured to reduce a CO2 concentration in a stream before, within and/or after the separator. In this example, CO2-reduction system reduces CO2 concentration in the "outbound" gaseous fuel, which may substantially improve the fuel value. For a gaseous fuel having significant CO2 (e.g., above 10%, including above 20%), an adiabatic flame temperature of the resulting combustion (e.g., in the kiln) may be increased significantly by removing CO2. In some cases, adiabatic flame temperature may be increased by over 100 C, including over 200 C.

A fuel stream processing system may comprise a volatilization reactor (e.g., to pyrolyze/evaporate/volatilize/gasify/reform a fuel) and a combustion plant. A fuel stream flows into the volatilization reactor to be reacted to form a volatiles stream and a char stream. The volatilization reactor may pyrolyze/gasify/volatilize/precombust or otherwise react a solid or liquid fuel prior to its passage to the combustion plant, typically with an inert, reducing, or mildly oxidizing gas (e.g., $N_2$, syngas, steam, and the like). The char stream flows into the combustion plant, where it is combusted. The volatilization reactor may be retrofit to an existing combustion plant (e.g., with an additional fuel supply).

The volatiles stream may be used directly. The separator may separate out one or more (typically >5, including >10, including >100) chemical species from the volatiles stream in addition to the fuel(s). The separated chemical species may be subsequently processed and/or utilized. Separated species may include syngas (H2+CO), gaseous hydrocarbons (including oxygenated hydrocarbons), liquid fuels (e.g., C4-C16) such as biofuels and/or biofuel precursors, volatile polymers, fuel gas, chemical compounds. fine chemicals, and the like. A residue (remaining, undesired chemicals which may have fuel value) may be routed to the combustion plant and combusted. A stream may be routed to a kiln, furnace, or other apparatus where it is combusted.

Figure 2:
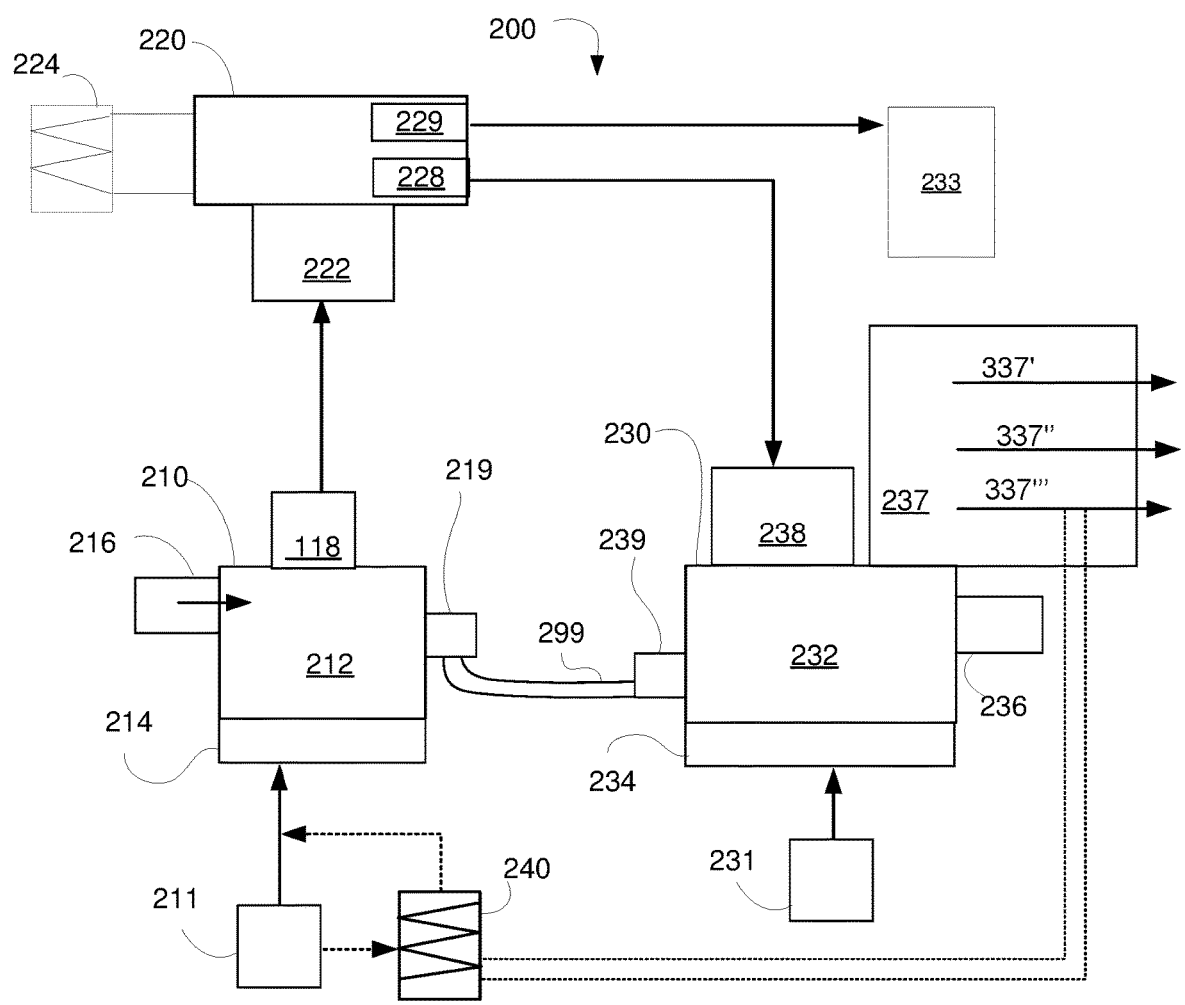
FIG. 2 is a schematic illustration of a fuel upgrading system coupled to a kiln, per an embodiment.

FIG. 2 is a schematic illustration of a fuel stream processing system coupled to a kiln, per some embodiments. A fuel stream processing system 200 may comprise a volatilization reactor 210 fluidically coupled to a combustion reactor 230. In FIG. 2, volatilization reactor 210 is coupled to a separator 220, which in this example separates a volatiles stream into a condensed phase (e.g., delivered to a kiln 233, such as an ore roaster) and a gaseous phase (in this case delivered to the combustion reactor 230).

The volatilization reactor volatilizes an incoming fuel stream to form a volatiles stream. The volatilized stream typically includes useful chemical species (e.g., gaseous and/or condensed fuels) which are extracted via one or more outlets 228, 229 after having been separated from a residue (FIG. 1) by the separator 220. Char (resulting from volatilization of the incoming fuel) is typically conveyed from the volatilization reactor to the combustion reactor, where it is burned. The volatilization reactor may be retrofit to an existing combustion reactor (each reactor may have its own fuel supply).

Volatilization reactor 210 receives the fuel stream via a fuel inlet 216 and pretreats at least a portion of the received fuel to yield a volatiles stream and a char stream. Volatilization typically comprises treating the fuel in a reaction zone 212 with an inert, reducing and/or relatively less oxidizing gas (e.g., than that used in the combustion reactor) such as N2, syngas, steam, CO2, and the like, delivered via gas inlet 214 from a gas supply 211. The char stream is output via a char stream outlet 219 to a char stream inlet 239 of the combustion reactor 230, where it is combusted with a relatively more oxidizing gas (e.g., air, O2). The volatilization reactor and combustion reactor may be discrete (e.g., with the char stream outlet/inlet coupled via a passage 299). The volatilization reactor and combustion reactor may be integrated (e.g., with the char stream outlet/inlet forming an opening in a wall between the reactors). In some cases, to prevent undesired reactions (e.g., polymerization, decomposition, precipitation), the volatilization reactor may include a fast pyrolysis reactor (e.g., that constrains volatiles to a residence time below 10 seconds, including below 3 seconds).

Combustion reactor 230 (e.g., a combined heat and power plant) includes a combustion zone 232 within which the char stream is reacted with an oxidant gas (e.g., air, oxygen, and the like). An oxidant supply 231 delivers oxidant via an oxidant inlet 234. In some embodiments, one or both of the inlets 214, 234 comprise diffuser plates (e.g., such that the respective reactors can function as fluidized beds). Combustion reactor 230 includes an exhaust 237, and may include an optional second fuel inlet 236 configured to deliver a fuel directly into the combustion reactor. Combustion of char may be augmented with fuel from the second fuel inlet 236 and corresponding supplementary fuel supply (not shown), which may be the main fuel supply to the combustion reactor (e.g., when retrofitting a volatilization reactor to an existing combustion reactor). One or both reactors may include an apparatus to increase reaction rates, especially if additional downstream fuel capacity is required. For example, the size of a bubbling FB volatilization reactor sized to provide a fuel stream for a 30 MW lime kiln may be reduced by adding forced flow within the bed, increasing the fuel-processing capacity of the volatilization reactor without a corresponding increase in overall size. A splashgenerator may be used to drive/direct flow within a fluidized bed, which may increase reaction rates and subsequent throughput.

The volatiles stream outlet 118 of the volatilization reactor is coupled to a separator 220 (e.g., comprising a fast condensation/fractionation reactor, a cyclone, an ESP, a filter, a scrubber, demister, a bag house, a decanter, a bath-quencher, and the like) via volatiles stream inlet 222. Separator 220 may extract and/or isolate desirable chemicals from the volatiles stream, outputting these species via at least one of a gaseous fuel outlet 228 and a condensed fuel outlet 229. One or more heat exchangers 224 may be used to remove heat from the volatiles stream, enhancing condensation. A heat exchanger 224 may be used to transfer heat from the volatiles stream to a fluidization gas delivered by a gas inlet (e.g., into the volatilization reactor). A separator may include a cyclone 225 and/or a filter 226 (including a ceramic filter, a candle filter, a bag house, an electrostatic precipitator) configured to separate condensed species from gaseous species. A filter may comprise several filters, cyclones, and the like. A filter may comprise a trap 226' (e.g., to capture heavy particles). Water, ash, media, acids, and condensable fuels may be separated. For example, a first separator may remove ash, a second separator may remove condensable fuels (e.g., tar), and a third separator (e.g., an electrostatic precipitator) may remove particles, aerosols, and the like. A residual stream comprising CO, CO2, H2, and other permanent gases may be sent for combustion (e.g., in a lime kiln or other combustor).

A reactor may include an absorption loop that exposes a stream to a liquid that condenses/absorbs a species (e.g., a scrubber, including a water-based scrubber, an organic scrubber, or an amine CO2 scrubber). The liquid may be circulated out, the species removed, and the liquid is reexposed to the stream. In some cases, the liquid/species are removed and replaced with fresh scrubbing liquid. In some cases, separator 220 outputs a residue. In FIG. 2, gaseous fuel outlet 228 is coupled to a corresponding inlet 238 of the combustion reactor, providing for the combustion of the gaseous fuel separated from the volatiles stream. A heat exchanger 340 may be coupled to an exhaust stream of the combustion reactor (e.g., via exhaust 237) to preheat a volatilization gas prior to its introduction into the volatilization reactor via gas inlet 214.

A volatiles stream may have a range of uses (according to fuel source, pretreatment conditions, and the like) such as for raw gas, syngas, and the like. The volatiles stream may include syngas (e.g., for use in a subsequent chemical process) gaseous species (e.g., gaseous fuels), liquid fuels (e.g., biofuels and/or biofuel precursors), and the like.

A fuel stream processing system may comprise one or more fluidized bed reactors. For example, volatilization reactor 210 may be configured as a volatilization stage of a fluidized bed reactor as described herein, and combustion reactor 230 may be configured as a combustion stage of a fluidized bed reactor as described herein. The reactors may share a fluidized bed of solids (e.g., separated by a wall) providing for a flow of char (and typically bed solids) from the volatilization reactor to the combustion reactor. The system may be implemented as a standalone system and/or retrofit to an existing combustion reactor (e.g., an existing fluidized bed boiler). The fuel stream processing system (e.g., the separator) need not incorporate a fluidized bed reactor.

Figure 3:
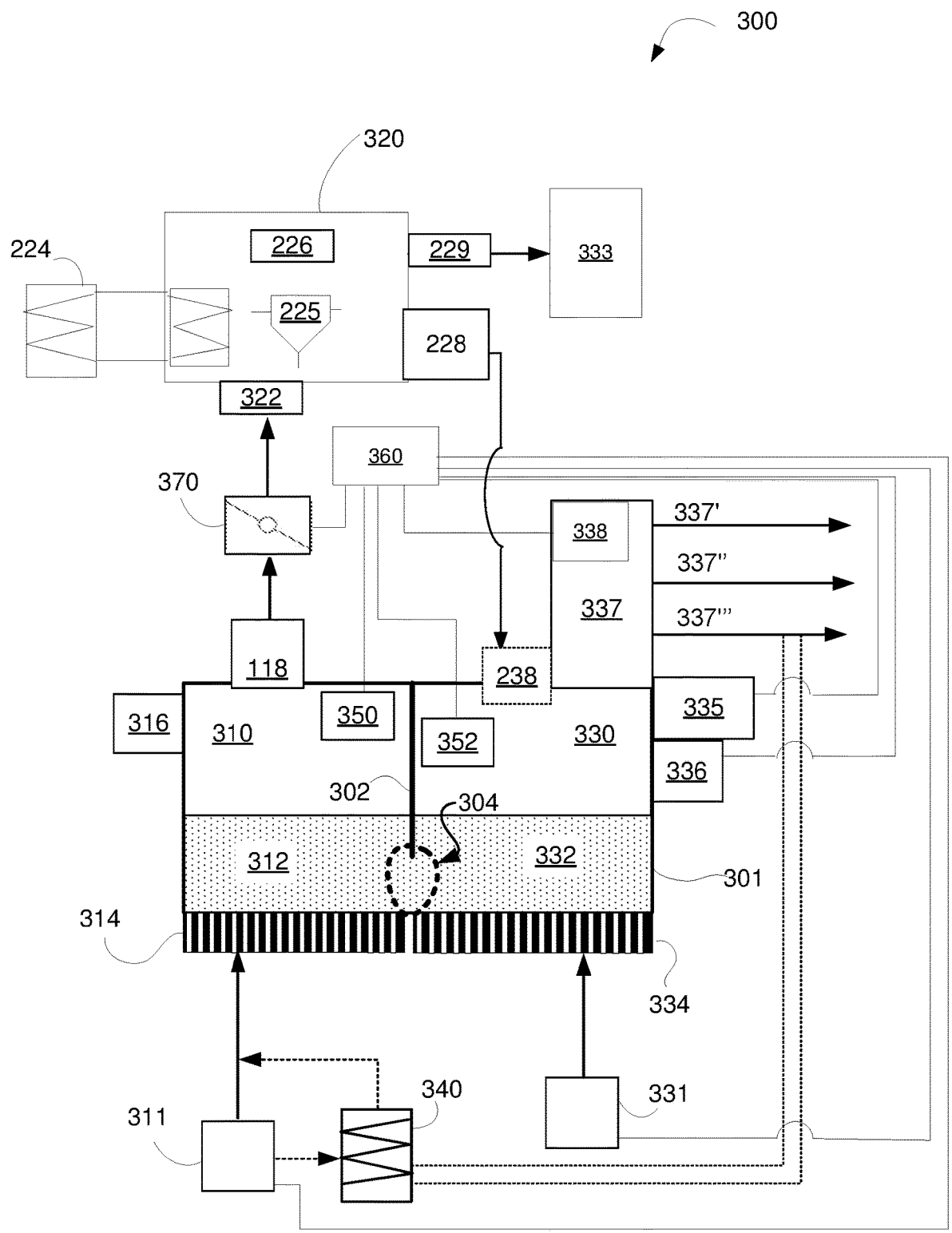
FIG. 3 is a schematic illustration of a fuel upgrading system comprising a fluidized bed reactor coupled to a kiln, per an embodiment.

FIG. 3 is a schematic illustration of a fuel upgrading system comprising a fluidized bed reactor coupled to a kiln, per an embodiment. In FIG. 3, a two-stage fluidized bed reactor creates a volatiles stream that is delivered to a separator 320, which separates a condensed fuel and delivers the condensed fuel to a kiln 333 (e.g., comprising a smelter). A multistage fluidized bed reactor comprises an otherwise contiguous fluidized bed (e.g., one bubbling FB) having at least a first (e.g., volatilization) and second (e.g., combustion) stages, each stage enabling a different chemical reaction. In this example, a first reaction zone 312 in a first portion of the fluidized bed and a second reaction zone 332 in a second portion of the fluidized bed provide for different reactions.

The first and second stages are separated, typically by a wall. The wall separates the gas phases above each stage, but allows the fluidized bed phases to communicate via an opening in the wall and/or a passage between beds of the stages. Thus, the fluidized bed phase (e.g., media and char stream) may flow between the stages, but the gas phase above the first stage is separated from the gas phase above the second stage. The fluidized beds may communicate via openings in the floor rather than the wall. The fuel residence time and/or transfer of fuel and bed material from the first to second stages is typically controlled via an increased/decreased gas pressure in the first stage vs. that in the second stage and/or the gas pressures supplied to the fluidization gas inlets. A controller coupled to pressure gauges within the stages may control these pressures (e.g., via a valve on the volatiles stream) to achieve a desired overpressure of the first stage vs. the second stage.

In exemplary FIG. 3, a fluidized bed reactor 300 comprises a container 301 (in this example, a single container) configured to hold a bed of bed solids. A wall 302 separates the container into a volatilization stage 310 and a combustion stage 330. Wall 302 may have an opening 304 through which bed solids and char may flow. Opening 304 may include char stream outlet 219, char stream inlet 239, and/or passage 299 (FIG. 2). Opening 304 may comprise openings in the floors of each stage, coupled by a passage. Wall 302 may include a plurality of walls. The media and char stream pass from the volatilization stage to the combustion stage, where the char is burned. The wall lets the media/char pass between stages, but prevents mixing of the gas phase in the volatilization stage with the oxidizing gas phase in the combustion stage.

The volatilization stage has a fuel inlet 316 configured to receive and deliver the fuel into the volatilization stage. The fuel inlet may include a lock hopper and/or other apparatus to transfer solid fuel while controlling gas flow/pressure. Fuel may be fed by gravity and/or auger. Fuel may be delivered to the lock hopper (e.g., via a feed screw) and a gas pressure within the lock hopper may be controlled to match that of the volatilization stage, such that fuel may be delivered to the volatilization stage at or above the pressure of the volatilization stage.

The bed solids are fluidized by a flow of gas from a LowOx gas supply 311 delivered via a gas inlet 314 (e.g., a diffuser plate, distributor plate having a nozzle arrangement/holes of any size and shape distributed across the plate to fluidize the bed) corresponding to the portion of the container (or the container) associated with the volatilization stage (e.g., first reaction zone 312). LowOx gas supply 311 supplies a (typically hot) gas chosen according to desired volatilization conditions (e.g., inert, reducing, mildly oxidizing), fuel source, desired composition of volatiles stream, and the like. The LowOx gas is typically mildly oxidizing (less oxidizing than that yielding complete combustion, e.g., steam, CO2, small amounts of oxygen, N2). The LowOx gas may, in some cases, be reducing (e.g., H2). Pressure drop across a distributor plate at the bottom of the bed may be controlled (typically in concert with gas pressure at the top of the bed) to achieve a desired bubble size and/or bubble volume (within the bed), convection pattern, fuel residence time, bed temperature, and the like. Bed temperature and various reactions may be controlled via stage pressure (e.g., to control bed height, reaction rates, and/or residence times). A typical volatilization stage may have a lower temperature at the top of the bed than at the bottom (although in the absolute bottom of the bed (the first centimeters from the bottom) where the fluidization media enters the bed, the temperature is typically lower). A reduced bed height in the volatilization stage typically reduces residence time within. A splashgenerator (FIGS. 5-8) may be implemented to increase bed transport in a fluidized bed reactor. In some kilns, increased bed transport in a volatilization reactor may be necessary to provide sufficient fuel to meet the required thermal capacity of the kiln.

A volatiles stream outlet 118 is configured to convey the volatiles stream out of the volatilization stage to separator 320. A volatiles pressure gauge 350 measures gas pressure in the volatilization stage, the volatiles stream outlet, and/or the corresponding volatiles line.

A reactor typically includes a means to control gas flow into and/or out of at least one stage, including multiple stages. Controlling this means in concert with pressure measurements, the controller may control the pressure difference between stages, typically via closed-loop (e.g., PID) control. In an embodiment, a volatiles outlet valve 370 (e.g., a butterfly valve) coupled to the volatilization stage outlet 118 is configured to control pressure in the volatilization stage and/or flow out of the volatiles stream outlet. FIG. 3 shows valve 370 upstream of separator 220; it may be downstream.

Combustion stage 330 includes an oxidant inlet 334 (e.g., a diffuser plate) correspondingly disposed at the portion of the container associated with combustion (e.g., second reaction zone 332). An oxidant supply 331 coupled to the oxidant inlet delivers a relatively more oxidizing gas (typically air) at a flow rate and pressure sufficient to fluidize the bed solids in the combustion stage and combust the char from the volatilization stage. An exhaust gas outlet 337 removes combustion products, power 337', chemicals 337", and/or heat 337'" from the combustion stage, which may be subsequently harvested from the exhaust gas (e.g., via a heat exchanger, a turbine, and the like). A combustion pressure gauge 352 disposed in the combustion stage and/or exhaust measures pressure in the combustion stage. Reactor 300 illustrates an optional $2^{nd}$ oxidant inlet 335 (e.g., to provide additional combustion air to supplement oxidant supplied via oxidant inlet 334). Additional gas and/or oxidant inlets may be included with the relevant stage. In this example, a fan 338 fluidically coupled to the exhaust 337 controllably extracts exhaust gas, which may be used to control pressure.

A controller 360 coupled to the pressure gauges (in this case, 350, 352) controls a pressure difference between the stages. In FIG. 3, controller 360 is coupled to the volatiles outlet valve 370, and controls pressure in the volatilization stage via throttling of the valve. During operation, controller 360 typically controls pressure of the volatilization stage to be different than that of the combustion stage. Lower pressure in the volatilization stage typically increases fuel/char residence time; higher pressure typically reduces residence time. Pressures may be controlled via a valve on the flue gas line and/or relative flow rates of the fluidizing gas inlets. Pressure control of bed solids flow (and the resulting mass transfer rates) may be used to control residence time within the stages (e.g., in a pretreatment stage prior to a combustion stage).

A combustion stage may include a second fuel inlet 336 (e.g., to supplement the fuel value of the char), which may include a separate (or the same) fuel supply, typically with its own lock hopper. Second fuel inlet 336 may be the main fuel supply for the combustion stage, with a separate fuel supply implemented for the volatilization stage (e.g., as a retrofit to an existing combustion stage). A retrofit implementation may comprise a BFB volatilization stage retrofit into an existing BFB combustor to create a multistage BFB reactor.

The reactor may include a heat exchanger 340 configured to extract heat from the exhaust gas and transfer heat to the gas supplied to the volatilization stage (as shown) and/or the combustion stage (not shown), which may improve energy efficiency.

Increased gas pressure in the first stage may drive char and bed material into the second stage. In some cases, natural convection of the bed material recirculates at least some media back into the first stage from the second stage. FIG. 3 illustrates an implementation in which the floor heights of the two stages are the same; the floor heights may be different. A sloped floor, stepped floor, and/or splashgenerator may be implemented to increase a flow in a desired direction.

A system may comprise a fluidized bed reactor (e.g., a BFB reactor) having a volatilization stage configured to operate as a volatilization reactor to create the volatiles stream for the separator. In an embodiment, a fluidized bed reactor configured to react a fuel in a fluidized bed of bed solids comprises a container configured to hold the bed of solids, and one or more walls separating the container(s) into at least a first (e.g., volatilization) stage and a second (e.g., combustion) stage. Typically, a single container includes both the volatilization and combustion stages, sharing a common bed, with a wall separating the gas phases of the stages, with each stage having its own gas supply for fluidization. Each stage may be operated as its own reactor, with their respective gaseous reaction products separated by the wall. The wall has an opening below the bed height (buried in the bed) such that solids may flow between the stages. As such, an incoming material to be reacted may be subjected to a first reaction in a first stage, then flow to the second stage with the bed solids, then be subjected to a second reaction in the second stage. Both stages may be operated as bubbling fluidized bed (BFB) reactors. The bed solids may have a mean particle diameter that is at least 0.4 mm, including at least 0.6 mm, particularly at least 0.75 mm, particularly at least 0.9 mm. Particles are typically below 2 mm, including up to 1.5 mm.

The wall between the volatilization and combustion stages separates at least the gas phases in the stages. An opening between the stages provides for transport of bed solids and char between the stages. The opening may be in the wall separating the stages. The opening may be in the floors or walls of the stages (e.g., openings in the floors connected via a pipe).

At least one stage (typically at least the volatilization stage) has a fuel inlet configured to receive the fuel, and one or more gas inlets at the bottom of the container to fluidize the bed within the stage. A LowOx gas supply configured to supply (typically hot) volatilization gas to the gas inlets provides a gas pressure and flow rate sufficient to fluidize the bed solids and volatilize the fuel to yield a (predominantly gaseous) volatiles stream and a char stream (comprising residual carbonaceous species, or "char"). Typically, an inert, reducing, or mildly oxidizing gas (e.g., $N_2$, syngas, steam, and the like) is used in the volatilization stage, enabling the creation of a volatiles stream having valuable chemical species. At least a portion of a volatiles stream may be used as a fluidization gas. A volatiles stream outlet conveys the volatiles stream out of the volatilization stage and a char stream outlet may convey the char stream (and typically some bed solids) out of the volatilization stage via the opening. A volatiles stream is typically predominantly gaseous, possibly with some small entrained particulates of liquid or solid (e.g., mist, dust). In an embodiment, the volatiles stream comprises biomass vapor, raw gas, wood gas, cellulose, hemicellulose, lignin, (and/or fractions thereof), polymers, monomers, wood extractives, syngas, fine chemicals, droplets of biomass, and the like. By having an independently controlled fluidization gas and ambient gas (composition, pressure, temperature), the volatilization stage may be used to extract chemicals from the fuel prior to combustion in the combustion stage.

The combustion stage may have a char stream inlet configured to receive the char stream (typically with some bed solids) from the volatilization stage. One or more oxidant gas inlets at the bottom of the combustion stage are coupled to a HiOx gas supply configured to deliver a relatively more oxidizing gas than that of the volatilization stage (e.g., air, O2, and the like) to fluidize the bed of solids in the combustion stage and combust the char stream to yield an exhaust gas. An exhaust gas outlet conveys the exhaust gas out of the combustion stage. Typically, the exhaust gas is used to generate electricity (e.g., with a gas turbine and/or steam turbine), and or may flow through a heat exchanger for extraction of the exhaust heat (e.g., for district heating, process heat, and the like).

An opening (e.g., in the wall or floor) couples the fluidized beds in the volatilization and combustion stages (e.g., via the char stream outlet/inlet) such that bed solids and char may flow between the stages, even though the gas phases are substantially separated. The volatilization stage and/or outlet may include a volatiles pressure gauge configured to measure the gas pressure within the volatilization stage, and the combustion stage and/or outlet includes a combustion pressure gauge configured to measure pressure within the combustion stage; these pressures are typically independently controlled.

A reactor may comprise separate stages in a contiguous bed of bed solids, each having its own fluidization gas, and a wall separating at least the gas phases above each stage. The reactor may include one or more means to control gas flow into and/or out of a stage. The volatilization stage may include a volatiles outlet valve fluidically coupled to the volatiles stream outlet (typically sufficiently downstream to prevent fouling and/or problems due to high temperature) and configured to controllably restrict gas flow through the volatiles stream outlet. The combustion stage may include an exhaust valve (e.g., coupled to the exhaust gas outlet) configured to controllably restrict gas flow out of the combustion stage. Either or both stages may include a fan (e.g., coupled to a fuel inlet and/or gas outlet, such as an induced draft fan) configured to controllably pump gas into or extract gas from the stage. A controllable gas source/gas inlet may be used to pressurize a stage. Pressure/flow rate of the fluidizing gas (e.g., the LowOx and/or HiOx supply) may be used to control pressure within a stage.

A controller is coupled to the pressure gauges and configured to measure the pressures within the volatilization and combustion stages (e.g., to measure a pressure difference). The controller is coupled to the means to control gas flow, such that a desired pressure difference between stages (according to the pressure gauges) may be maintained via operation of the gas flow means, typically using closed-loop control. A controller may control a volatiles outlet valve (restricting gas flow out of the volatilization stage) and/or an exhaust fan (extracting gas from the combustion stage).

The controller operates the gas flow control means to achieve a desired pressure difference between the beds, which may be used to control residence time, reaction rates, convection (within and between beds), and/or the transfer rate of char from the volatilization stage to the combustion stage. During steady state operation, the controller may control the residence time of fuel particles via the pressure difference. A longer residence might lead to an increased degree of volatilization (and thereby to a reduced amount (flow) of char). Typically, the controller controls the pressure in the volatilization stage to be greater or less than the pressure in the combustion stage, according to a desired reaction and residence time in each stage. The controller may control pressure to maintain substantially the same pressure in both stages. This pressure difference may be used to controllably drive a flow of the char stream and bed solids from the volatilization stage to the combustion stage via the opening/char stream outlet/char stream inlet (e.g., by decreasing, then increasing, pressure in the volatilization stage to "breathe" or "flush" the char to the combustion stage). The velocity/pressure of the fluidization gas may be controlled (e.g., with the stage pressure) to control a residence time of fuel and/or char within a stage. Gas inlet velocities and ambient pressures may be controlled to independently raise and lower the fluidized bed height of each stage.

The separation of the gas phases in the volatilization and combustion stages enables the capture and separate utilization of products of reactions that use different fluidization gases in the respective stages and/or the production of different chemical species within each stage. An inert, reducing, and/or less oxidizing gas is typically used for fluidization in the volatilization stage. The volatilization stage volatilizes (e.g., pyrolyzes/gasifies/evaporates/reforms) or otherwise reacts the fuel to form volatiles and char, after which the char is transferred to the combustion stage. Volatilization may include partial oxidation, but typically does not result in complete oxidation (thus the residual char). Extraction of a combustible gas produced from a solid or liquid fuel may implement a single fluidized bed reactor having multiple stages. A combustion stage, where part of the cross section of the reactor vessel is fluidized with an oxidizing gas, may be preceded by a volatilization stage (fluidized with a less oxidizing gas), in which extraction and/or reaction is performed in a secondary reactor volume in which the fuel residence time is controlled by adjusting the pressure difference between the stages. Fluidization flow rates, a pressure difference between the stages ($P_1-P_2$) and/or the pressure drop relationships across a distributor plate and the fluidized bed (e.g., $((P_{d2}-P_2)/(P_{d1}-P_{d2}))$ and/or the distance between the distributor plate and the lower edge 302' of gaswall 302 volume may be controlled. In some embodiments, an extracted volatiles stream has a lower heating value higher than, including at least two times higher than, the average heating value of the total gas volume leaving the volatilization and combustion stages.

Figure 4:
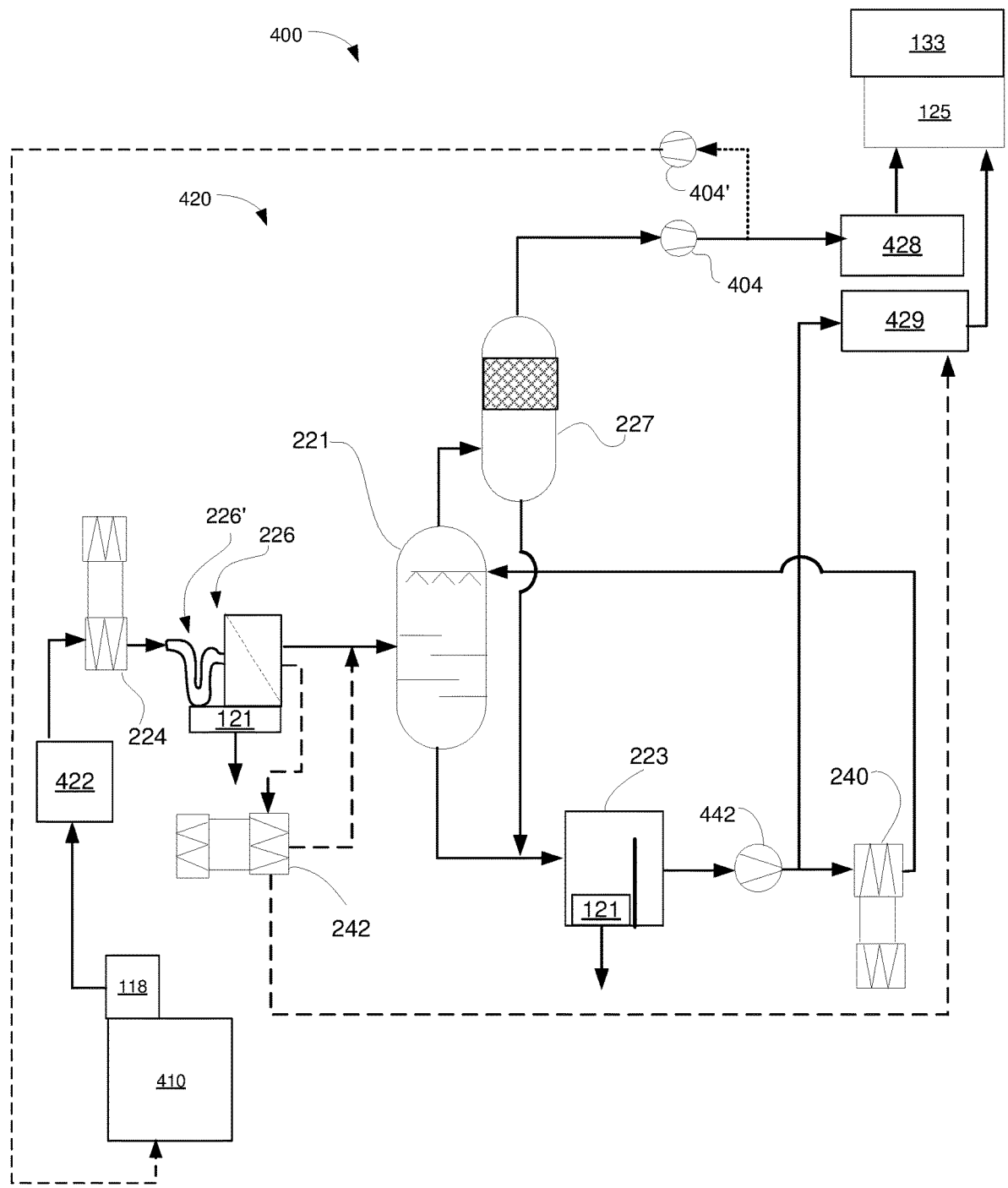
FIG. 4 is a schematic illustration of a fuel upgrading system coupled to a kiln, per an embodiment.

FIG. 4 is a schematic illustration of a fuel upgrading system coupled to a kiln, per an embodiment. FIG. 4 illustrates a separator 420, which in this example is coupled to a volatilization reactor 410 and a lime kiln 133. Separator 420 may be implemented separately of these other components.

Separator 420 comprises an inlet 422 configured to receive a volatiles stream (e.g., from a volatilization reactor 110/210/310/410) comprising at least H2O, particles, and aerosols (which may be liquid or solid). A first heat exchanger 224 may be coupled to the inlet 422 and configured to receive the volatiles stream and cool the volatiles stream to a desired temperature. An exemplary temperature of an incoming volatiles stream may be from about 700 to 850 C, including from about 750-800 C. The heat exchanger may cool the stream, e.g., to a temperature below 550 C, including below 500 C, such as from about 300-500 C. Heat exchanger 224 is typically implemented to cool the volatiles stream to a temperature at which a subsequent filter 226 may operate effectively without degradation. In an embodiment (e.g., with a heat exchanger 242 after a filter 226 that is capable of high temperature operation) heat exchanger 224 may be eliminated.

A filter 226 (e.g., a candle filter, a ceramic filter, a cyclone, an ESP, a bag house) is coupled to inlet 422 (typically downstream of heat exchanger 224) and is configured to remove the particles from the volatiles stream. A scrubber 221 (e.g., a venturi, a packed column, and/or other liquid-gas contacting apparatus) is coupled to filter 226 and configured to receive the filtered stream and quench the filtered stream using a quench liquid. Typically (as discussed below) the quench liquid comprises a portion of the separated condensed fuel (later extracted). Scrubber 221 typically utilizes reaction between the quench liquid and filtered stream to "scrub" the stream, dissolving organics and separating the stream into a gaseous phase comprising permanent gases and light organics (and typically some aerosols) and a condensate (typically comprising condensed fuel and water). Heat exchanger 224 and/or scrubber 221 may be operated to reduce stream temperature to below the condensation point of water (at scrubber pressure). Alternately, gashouse H2O may be conveyed with the gaseous phase (e.g., for subsequent removal).

Separator 420 may comprise a demister 227 (in this example, directly after the scrubber 221) to receive the gaseous phase and remove aerosols from the gaseous phase, yielding a de-aerosoled gaseous fuel. Removal of aerosols may reduce clogging of downstream components (e.g., injection nozzles injecting the fuel into a kiln). The gaseous fuel may be conveyed from the separator via gas outlet 428, which in this example is coupled to a lime kiln 133 via a meter 125. A fan 404 may facilitate transport of this gaseous phase.

Condensate (e.g., from scrubber 221) may flow to a decanter 223 configured to separate an aqueous phase (e.g., predominantly water) from a predominantly organic phase (e.g., not soluble in water). The condensed organic phase typically comprises tar (e.g., primary, secondary, and/or tertiary tar), and/or other species having relatively high boiling points. A pump 442 may facilitate transport of the organic phase.

A first portion of the condensed organic phase may be delivered to condensed fuel outlet 429, which in this example is coupled to lime kiln 133 via meter 125. A second portion of the condensed organic phase may be delivered to scrubber 221 for use as a quench liquid in the scrubber. A second heat exchanger 240 may be used to cool the quench liquid comprising the condensed organic phase prior to delivery to the scrubber.

FIG. 4 illustrates an implementation in which both gaseous and condensed fuels are utilized by lime kiln 133. In some cases, different fuels go to different reactors. FIG. 4 illustrates an optional line in which a portion of the gas stream (e.g., the de-aerosoled gas stream) is diverted (in this case via fan 404') for use as a volatilization gas in the volatilization reactor. The gas stream may be used to fluidize a bed of bed solids in a stage (e.g., a volatilization stage). The gas stream may be preheated in a heat exchanger (e.g., heat exchanger 224) prior to its delivery to the volatilization reactor.

Separator 420 may be configured to separate out one, two, three, four, or even more components from an incoming stream. Typically, at least solid particles (e.g., unvolatilized fuel carried by the gas phase, ash, and the like) are removed. H2O may be removed. Useful chemical species (e.g., syngas, rawgas, precursors and the like) may be separated. Typically, an output stream (e.g., a fuel stream) is separated into gaseous and condensed phases to facilitate handling and subsequent utilization.

In some aspects, an appropriate heat exchanger 224 (e.g., having a clog resistant surface) may provide for the functionality of filter 226 and/or scrubber 221. Ideally, a heat exchanger is used to extract useful heat from the volatiles stream (e.g., to drive a steam turbine). In some cases, a heat exchanger removes heat to bring a stream to a desired temperature, but the removed heat is not useful. As such, it may be advantageous to design the separator to remove as much heat as possible as useful heat. However, large temperature reductions across the heat exchanger may result in clogging, fouling, and/or other precipitation of species that degrade the heat exchanger. Operating heat exchanger 224 at the highest possible temperature gradient may increase thermal efficiency, but the outlet temperature should be maintained to avoid clogging/deposition/fouling. Increasing the thermal energy extracted by heat exchanger 224 (typically useful heat) may reduce the energy extracted by heat exchanger 240 (typically non-useful heat), increasing efficiency while still yielding a quench liquid at a suitably cool temperature.

An aspect may comprise an optional heat exchanger 242, which (in FIG. 4) is disposed between filter 226 and scrubber 221. The heat exchangers, filter, and (if needed) scrubber typically cooperate to efficiently extract heat while removing residue that might be deleterious to a downstream process. A stream from filter 226 (e.g., having solid particles already removed) may be run through heat exchanger 242, which extracts useful heat (e.g., to make steam). The heaviest, highest boiling-point tars may condense in heat exchanger 242, such that they may be preferentially removed. The remaining stream (permanent gases, lighter tars) may then pass to scrubber 221. The quench liquid used by scrubber 221 (from decanter 223) is preferably low viscosity (to facilitate pumping and increase its ability to act as a solvent). As such, removing the heavier tars from the quench liquid (e.g., via heat exchanger 242) may increase overall system efficiency. The removed tars may be used separately and/or (as shown) output with other condensed fuels. Heat exchanger 242 may be disposed between the filter and the demister (e.g., upstream of the scrubber) according to the capacity of the heat exchanger to extract useful heat without fouling. Heat exchanger 242 may replace scrubber 221 in some implementations.

Scrubber 221 (in combination with heat exchanger 240) typically cools the inbound stream significantly (e.g., to a temperature at which water precipitates out to be decanted), but heat exchanger 240 may not extract useful heat from this stream. Heat exchanger 242 (upstream of scrubber 221) may receive a higher temperature stream and extract useful heat from this stream, reducing the heat load delivered to scrubber 221. For a high performance heat exchanger (e.g., capable of significantly reducing temperature without fouling), heat exchanger 242 could even replace scrubber 221. Heat exchanger 242 may have a heavy tar outlet, a light tar outlet, (one or both of which may be decanted to remove water) and a gaseous phase output (e.g., going into demister 227). A heat exchanger may comprise a heavy tar outlet (downward in FIG. 4) configured to convey tars having the highest boiling points (e.g., those that drop out of the gas phase first) and a gaseous outlet (to right in FIG. 4) configured to deliver permanent gases and optionally volatile tars (e.g., to a demister, optionally via a scrubber).

Figure 5:
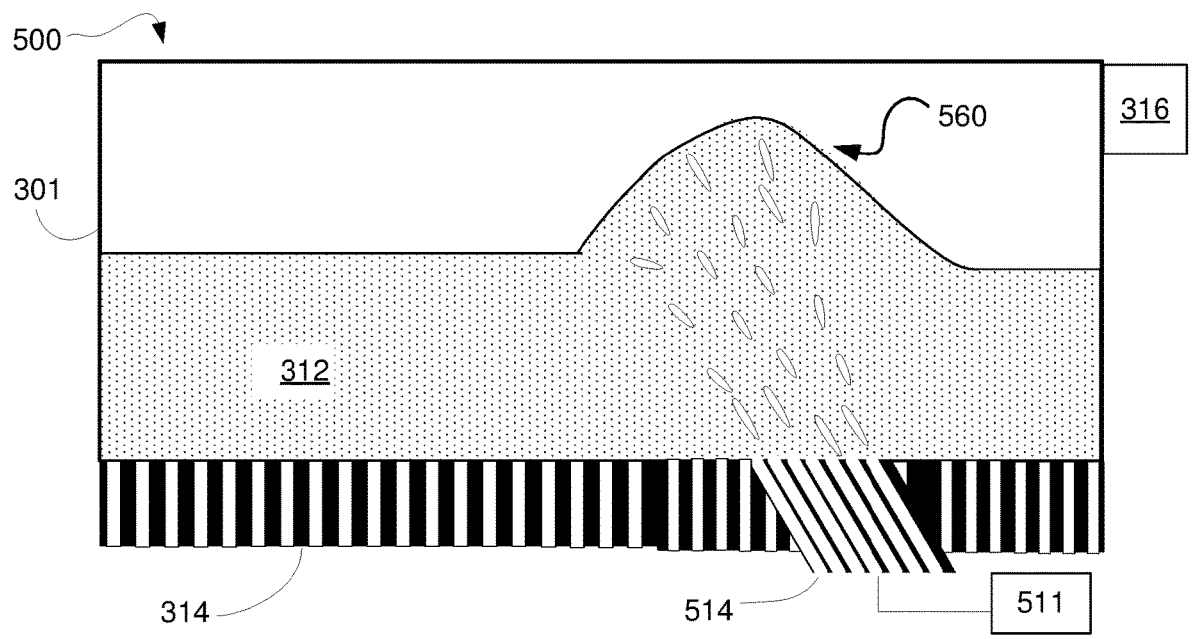
FIG. 5 is a schematic illustration of a side view of a splashgenerator operating in a fluidized bed, per an embodiment.

FIG. 5 is a schematic illustration of a side view of a splashgenerator operating in a fluidized bed, per an embodiment. Reactor 500 comprises a container 301 configured to contain a bed of bed solids. A gas inlet 314 coupled to a gas supply (not shown) is configured to fluidize the bed of solids with a gas in the fluidization regime to create a fluidized bed. Reactor 500 may be operated as a BFB or a CFB. A fuel inlet 316 delivers a material to be reacted in the bed (e.g., a fuel). Reaction typically takes place within the bed, as illustrated by reaction zone 312. The bed solids may have a mean particle diameter that is at least 0.4 mm, including at least 0.6 mm, particularly at least 0.75 mm, particularly at least 0.9 mm. Particles are typically below 2 mm, including up to 1.5 mm.

Reactor 500 includes a splashgenerator 514, typically configured to impart a directed, aligned momentum to a portion of the bed solids in reaction zone 312 (e.g., using high velocity jets of gas, large wave oscillations, acoustic/pressure pulses, and the like). A splashgenerator may impart a substantially vertical momentum (e.g., FIG. 8) or a momentum having a horizontal component (FIGS. 5, 7), including a substantially horizontal momentum (not shown). Splashgenerator 514 is coupled to a transport gas supply (511) configured to supply a transport gas (e.g., flue gas, steam, volatilization gas, volatiles stream, air) to the splashgenerator. The momentum is typically at least partially upward; the momentum may be at least partially horizontal. The resulting momentum causes a localized portion of the bed solids in zone 312 to be preferentially accelerated, schematically illustrated as a splashzone 560. Splashzone 560 corresponds to a localized portion of the bed having higher velocity, higher magnitude, and/or otherwise different convection than that in the surrounding bed, and may comprises pulsed splashes, turbulent-fluidized, fast-fluidized, and/or entrained jets of solids. A splashgenerator may transport solids relatively long distances within/above the bed (e.g., at least 20 cm, including at least 40 cm, including at least 1 m). Long distances generally require more energy, which may benefit from the use of pulsed splashes. A splashgenerator may create large waves of bed solids (e.g., having an amplitude larger than 20% of, including 50% of, including 80% of, the fluidized bed height). For simplicity, various figures illustrate splashzone 560 as "above" the bed; it may be within the bed (although such a configuration is not readily illustrated). The momentum imparted by the splashgenerator may be used to control convection, circulation, heat transfer, bed uniformity, stirring, and the like.

Gas inlet 314 typically comprises fluidization nozzles that inject gas downward, horizontally, and/or slightly upward (if the nozzles have inbuilt seal systems). Fluidization typically requires fast mixing/convection/turbulence. A splashgenerator 514 may comprise jet nozzles configured to inject aligned, substantially parallel jets of transport gas. The nozzles may be horizontal, but are typically at least partially upward, and are typically designed to generate jets rather than fluidization.

Splashgenerator 514 may be configured to inject a transport gas into the bed at a velocity, pressure, and/or flow rate that is higher than the corresponding velocity/pressure/flowrate of at least one gas inlet, including at least 2×, at least 3×, at least 5×, at least 10× higher. The gas injected by the splashgenerator may be the same or different as the fluidizing gas of the gas inlet 314. The temperature may be the same or different.

Figure 6:
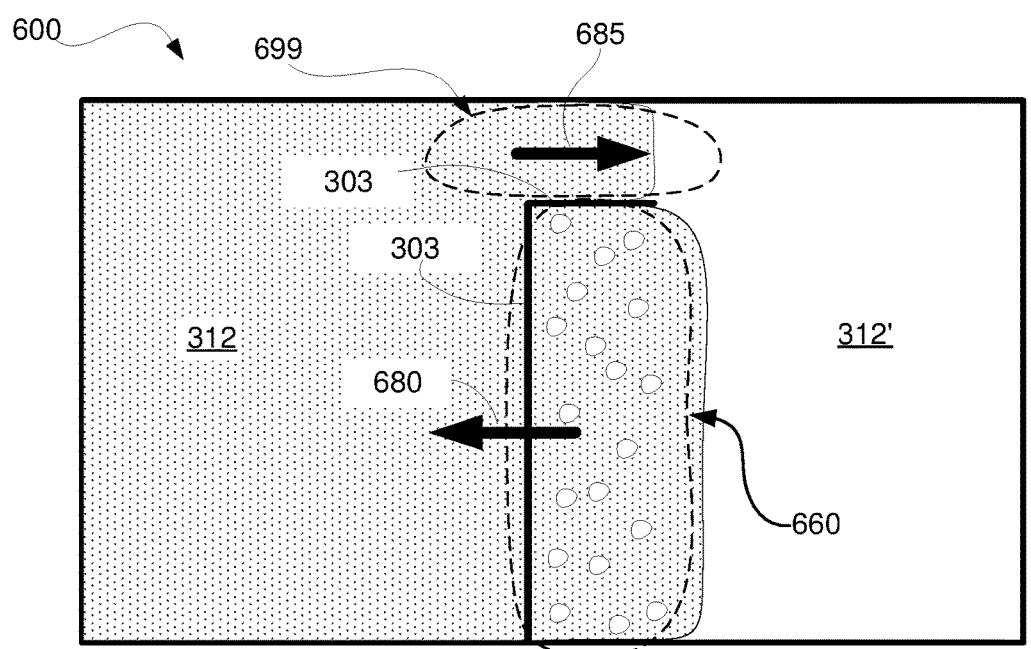
FIG. 6 is a schematic illustration of a compact circulating fluidized bed reactor, showing a plan view of the top of the bed, per an embodiment.

FIG. 6 is a schematic illustration of a compact circulating fluidized bed reactor, showing a plan view of the top of the bed, per an embodiment. In reactor 600, a container 301 contains a bed of bed solids. A bedwall 303 separates at least a portion (typically at least the bottom) of the bed into a first reaction zone 312 and a second reaction zone 312'. Bedwall 303 may partially separate the zones (e.g., allowing some convective flow). The wall may not extend entirely to the bottom of the bed or above the surface of the bed, although the wall typically separates at least the lowermost portions of the zones. The wall may substantially entirely separate the beds of the zones.

The zones may have different fluidization gases, temperatures, and/or otherwise enable different reactions in different zones. A gas inlet 314 at the bottom of the bed in the first reaction zone is configured to deliver a first gas to fluidize the bed solids in the first reaction zone 312. A gas inlet 314' at the bottom of the bed in the second reaction zone is configured to deliver a second (typically different) gas to fluidize the bed of bed solids in the second reaction zone 312'. The fluidization gas compositions, velocities, temperatures, and the like may be the same or different. Typically, at least one zone (including both) include a fuel inlet 316 to receive a fuel and/or other species to be reacted in the reactor. In this example, fuel inlet 316 delivers fuel to second reaction zone 312'. Various other inlets and outlets are not shown for simplicity.

A splashgenerator 514 (not shown—below the bed surface in this view) is configured to impart a directed momentum to a portion of the bed solids in the second reaction zone 312' (e.g., using jets of gas, wave oscillations, pulses, and the like). The momentum is typically at least partially (and may be entirely) upward (e.g., for a high bedwall 303). The resulting momentum causes a localized portion of the bed solids in second reaction zone 312' to pass by/through/over/under bedwall 303 into the first reaction zone 312. One or more walls (not shown) may be used to direct momentum (e.g., funnel waves toward the wall). As compared to the normally fluidized bed height (when fluidized by its respective gas inlet) the added momentum of the splashgenerator may locally increase bed height—"splashing" bed solids and other material over the wall, and typically "sprays" or "jets" or otherwise entrains the solids to carry them long distances (e.g., over 20 cm) as compared to standard "fluidization" inlets. The directed flow from the splashgenerator typically increases the height 712 (FIG. 7) of the "receiving" first reaction zone 312 when the splashgenerator is operating (and correspondingly reduces the height 713 (FIG. 7) of second reaction zone 312') as illustrated schematically. Splashgenerator 514 (FIG. 5) may be configured to inject a gas into the bed at a velocity, pressure, and/or flow rate that is at least 20% higher than the corresponding velocity/pressure/flowrate of the second gas inlet 314', including at least 50%, including at least 2×, at least 5×, at least 10× higher. The gas injected by the splashgenerator may be the same or different as the fluidizing gas of the gas inlets.

As a result of the directed momentum generated by the splashgenerator, a localized flow of bed solids (drivenflow 680) comprising a flow (of bed solids, fuel, char, and the like) driven by the splashgenerator is driven past/through (or in this illustration, over) bedwall 303 into first reaction zone 312. A drivenflow 680 may pass through an opening in bedwall 303. For simplicity, FIG. 6 illustrates drivenflow 680 as being associated with a splashzone 860, from which solids "splash over" bedwall 303, somewhat like a geyser spraying water out of a hole in the earth. A bedwall 303 may have a height 710 (FIG. 7) above at least one expected normally fluidized bed height 712, 713 (FIG. 7) of at least one of the reaction zones 312/312' (typically at least the reaction zone having the splashgenerator), such that solids do not traverse the wall during normal fluidization; they must be driven by the splashgenerator, independent of fluidization velocities, over the bedwall. The height of bedwall 303 may be at least 20%, including at least 40%, at least 100%, at least 150%, at least 200%, of the fluidized bed height (712, 713). The bedwall height may be 2× or even 3× the bed height. The splash zone may splash solids over the bedwall.

Although integrated into a single container, each zone may be operated as its own, independently controlled bubbling fluidized bed. In contrast to systems that incorporate risers, downcomers, cyclones for recovering bed solids, and the like, the reaction zones are integrated into the same container such that the beds have substantially the same bed heights and "share" solids via liquid-like flow. High flow rates over long distances may be avoided, significantly reducing energy consumption and erosion.

A bedwall 303 may be lower than, approximately equal to, or higher than, the "normally fluidized" bed heights, according to a desired amount of non-driven bed flow past the wall. A lower wall allows more "natural convection" bed flow; a higher wall reduces this convection. A wall extending above the bed surface substantially prevents this "natural convection" proximate the wall, and so transport between beds is more tightly controlled by the splashgenerator and corresponding returnflow (below).

FIG. 6 illustrates an overhead view of a section of reactor 600, and illustrates a passage 699 through which bed solids return from the first reaction zone 312 back to the second reaction zone 312'. Returnflow 685 of bed solids "returns" the solids driven by drivenflow 680, enabling circulation of solids between separate reaction zones of a single fluidized bed. Passage 699 may include its own fluidization gas inlet, and may provide for the returnflow 685 flow back to the reaction zone having the splashgenerator. Flow of solids past bedwall 303 (drivenflow 680 driven by splashgenerator 514) and corresponding returnflow 685 of the solids provides for a compact "circulating" fluidized bed having the benefits of bubbling fluidized beds—a compact, integrated, circulating, dual-zone bubbling, fluidized bed. A passage 699 may be fluidized by a passage gas inlet 214' configured to fluidize solids in the passage, such that solids return via natural convection (flowing downhill according to the pressure gradient created by the drivenflow). A passage may include its own (typically horizontally directed) splashgenerator to increase horizontal velocity of the returnflow. A passage may comprise a gap in a bedwall. A reactor may include a splashgenerator configured to splash, spray, and/or jet a drivenflow (680) of bed solids from one reaction zone into another reaction zone (e.g., past a bedwall 303 separating at least a portion of the bed into first and second reaction zones). Passage gas inlet 214' may fluidize the solids in the passage using the same or different gas than that used by one or more of the gas inlets, typically with the same gas as that delivered by gas inlet 314' to fluidize the second reaction zone 312'.

It may be advantageous to combine a splash generator with a fuel stream processing system (e.g., as in FIG. 3). Various aspects may be used to control residence times and reaction rates within a stage, and heat and/or mass transfer between the stages, enabling a wide range of chemical reactions. Pressure control above each stage, gas inlet flow rates, bed heights (and thus hydrostatic pressure at the gas inlet) and/or pressure drop across the distributor plates themselves may be combined with flow control via directed and return flows (e.g., using a splashzone between stages) to control residence times, heat transfer rates, mass transfer rates, and the relative concentration of various species. A reactor may comprise a gaswall disposed below an expected bed height that prevents gas flow but allows for solids flow beneath the gaswall. A splashgenerator may impart momentum that causes a drivenflow of solids to flow from one side of the gaswall to the other.

Figure 7:
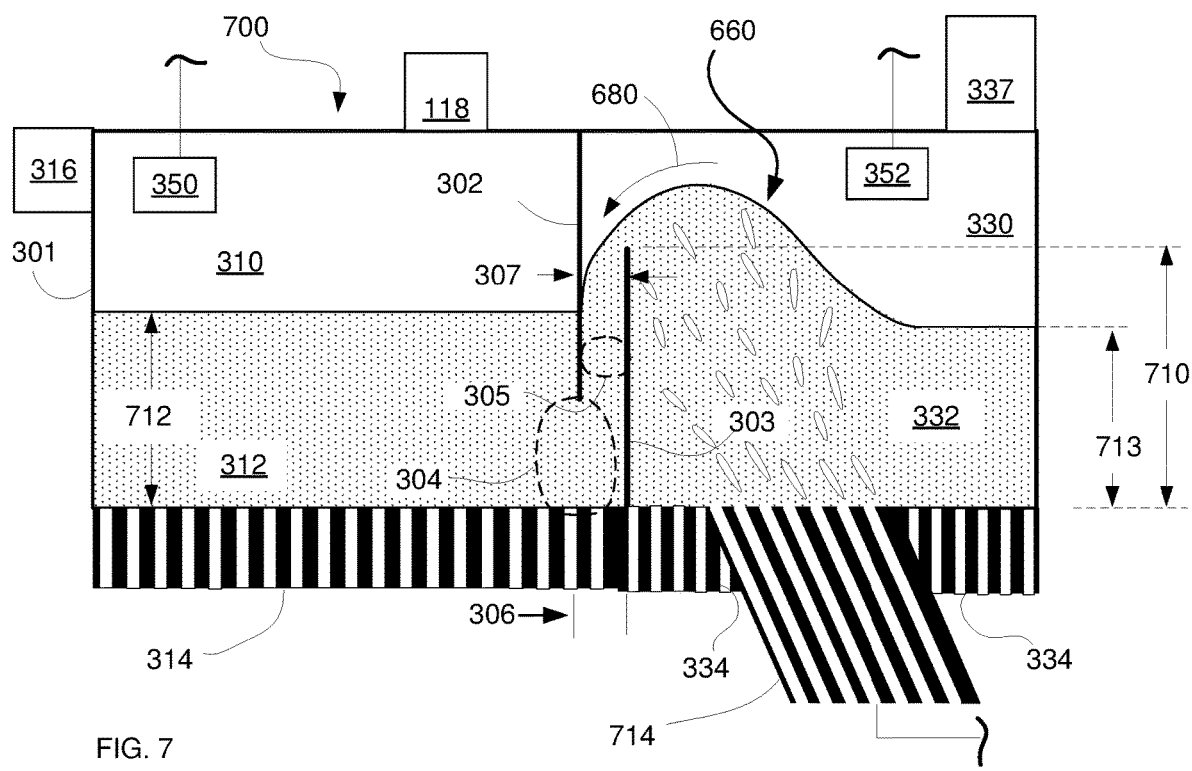
FIGS. 7 and 8 are schematic illustrations of side views of reactors comprising gaswalls, per embodiments.
Figure 8:
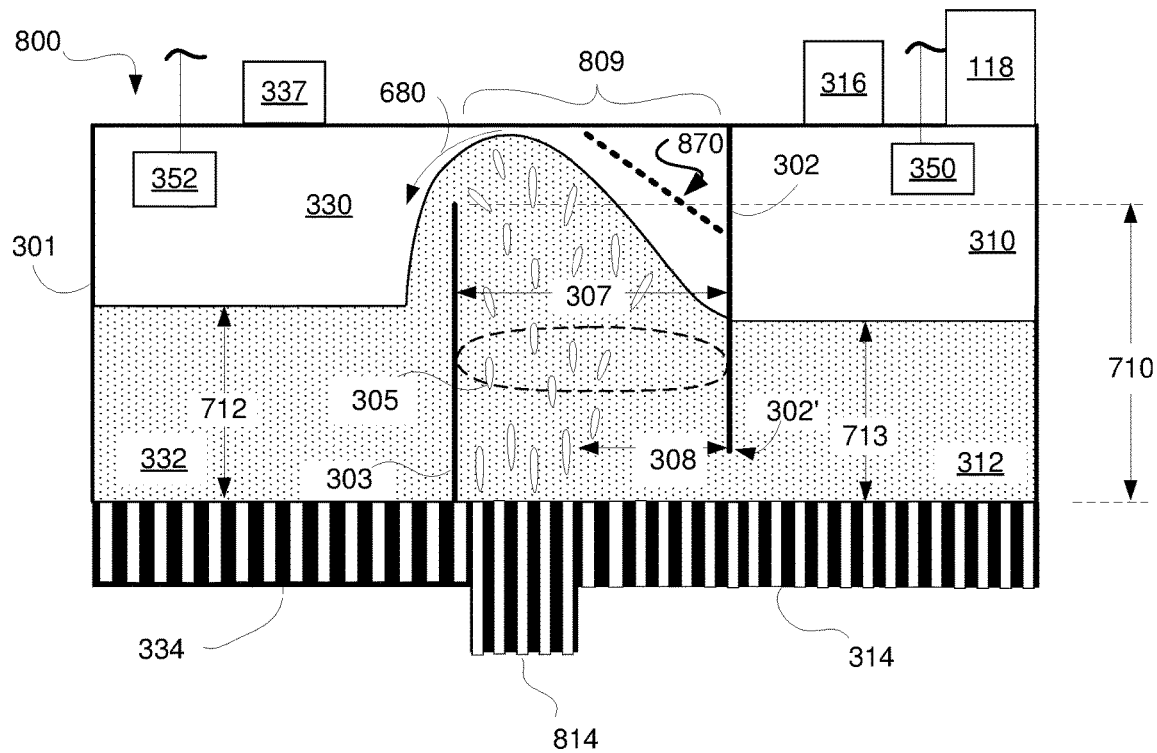

FIGS. 7 and 8 are schematic illustrations of reactors comprising a gaswall, per various embodiments. FIGS. 7 and 8 illustrate a splashgenerator in combination with pressure gauges and a pressure control means (not shown); pressure need not be controlled in some cases. In FIG. 7, a reactor 700 comprises an angled splashgenerator 714 disposed in a combustion stage 330; FIG. 8 illustrates a substantially vertical splashgenerator 814. FIG. 7 illustrates a reactor 700 in which a splashgenerator is disposed on the same side of a bedwall 303 as the combustion gas inlet 334. FIG. 8 illustrates a reactor 800 in which a splashgenerator is disposed on the opposite side of a bedwall 303 than the combustion gas inlet 334. FIG. 7 illustrates a reactor in which the splashgenerator is disposed on one side of the bedwall and the gaswall is disposed on the other side of the bedwall. FIG. 8 illustrates a reactor in which the splashgenerator and gaswall are both disposed on the same side of the bedwall.

A passage gas inlet (e.g., incorporating aligned high momentum nozzles and/or a splashgenerator, not shown) may be implemented to facilitate bed transport control. High momentum injections may induce entrainment, fast-fluidized, and/or turbulent-fluidized solids. Reactors are shown with thin walls, but they may include thick walls and/or with gaslocks. These figures illustrate the combination of a splashgenerator-controlled solids flow between reaction zones 312/332 separated by a bedwall 303 (e.g., as in reactor 600) with separate reaction stages 310/330 separated by a gaswall 302, each having its own fluidization gas (e.g., as in reactor 300). One stage has the first gas inlet, the other stage has the second gas inlet, and a wall separates the gas phases above the stages. Various gaps/openings/passages provide for drivenflow/returnflow between the stages. For simplicity, the stages are described as volatilization and combustion stages; fluidization gas composition may be chosen independently of splashgenerator location and/or transport gas.

Container 301 includes a bedwall 303 at least partially separating (in this case, substantially entirely separating) the bed solids into first and second reaction zones 312/332, and a gaswall 302 that separates at least the gas phases above the corresponding volatilization and combustion stages 310, 330. An opening 304 in/below the gaswall 302 provides for solids flow between the stages while blocking gas flow. In this example, height 710 of bedwall 303 is higher than the normally fluidized bed heights of both zones 312/332, and fuel inlet 316 delivers fuel to the first reaction zone 312/ volatilization stage 310. The gap/opening 304/305 and passage 699 (FIG. 6) provide for the circulation of bed solids between the reaction zones while the gases remain substantially independent. The first reaction zone may be operated as a volatilization stage (with a relatively less oxidizing gas, including an inert gas) and the second reaction zone may be operated as a combustion stage (with a more oxidizing gas). The drivenflow 680 of solids from the combustion stage and returnflow 685 of solids from the volatilization stage (or vice versa) may be used to circulate solids from the combustion stage to the volatilization stage and back again, while gaswall 302 enables separate atmospheres, pressures, and the like of the two stages. Typically, bedwall 303 separates at least a portion of the beds (but not the gases) and gaswall 302 substantially separates the gas phases (but not the beds).

FIG. 7 illustrates a side view in cross section. In reactor 700, container 301 containing the bed of bed solids includes at least two walls 302, 303. Bedwall 303 separates at least a portion of the bed into a first reaction zone 312 configured to operate as a first stage 310 comprising the first gas inlet 314 and a second reaction zone 332 configured to operate as a second stage 330 and comprising the second gas inlet (314', 334), each gas inlet fluidizing with its own gas. A gap 305 at least partially defined by a distance 307 between the first and second walls (302, 303) provides for a flow of drivenflow 680 of bed solids from the second stage to the first stage. The region between walls (e.g., gap 305) may comprise a transport chamber that transports bed solids and char between stages. In this example, the transport chamber is fluidized by gas inlet 314 (i.e., the region is to the left of bedwall 303) but shares an ambient gas above with the stage 330 (i.e., the region is to the right of gaswall 302). A passage 699 (FIG. 6) provides for the returnflow 685 of bed solids from the first stage to the second stage. In this example, bedwall 303 has a height 710 that extends above the "normally fluidized" bed heights (712, 713) of the zones, such that the beds are separated except for drivenflow 680 and returnflow 685 (FIG. 6).

A volatilization stage 310 may include at least a majority (typically substantially all) of the first reaction zone 312, and a combustion stage 330 may include at least a majority of (e.g., substantially all) of the second reaction zone 332. Gaswall 302 separates the gaseous phase in the volatilization stage 310 (first reaction zone 312) from that of the combustion stage 330 (second reaction zone 332). An opening 304 through and/or below the gaswall 302 and below the expected bed height is configured to provide for a flow of the drivenflow 680 (e.g., bed solids and char stream) from the combustion stage 330 to the volatilization stage 310, having been driven past bedwall 303 by the splashgenerator, but substantially prevents gaseous communication between the reaction zones.

As combustion is typically exothermic, a splashgenerator may be used to transfer heat from the combustion stage to the volatilization stage, which may reduce the need for gas preheating in the volatilization stage. Typically, the combustion stage is hotter than the volatilization stage, and so control of the splashgenerator-induced momentum may be used to control heat transfer from the combustion stage to the volatilization stage via control of the drivenflow 680 of solids. Such a configuration may also be used to "additionally volatilize" the char, such that slow reactions may completed on a "second lap" through the volatilization stage. A passage 699 (FIG. 6) provides for the returnflow 685 of bed solids from the volatilization stage to the combustion stage when the splashgenerator is operating.

The gaswall 302 may be disposed in either reaction zone, including within the first reaction zone 312 (e.g., proximate to bedwall 303) or second reaction zone 332. With respect to bedwall 303, the splashgenerator may be disposed in either reaction zone, including 332 and/or 312. Drivenflow of solids may be facilitated by locating the splashgenerator in one zone and the gas-blocking gaswall 302 in the other zone, such that drivenflow 680 splashes against the second wall and drops into the gap 305 between the walls. Typically, gaswall 302 is located proximate bedwall 303 (e.g., within a distance that is less than 20%, including less than 10%, including less than 5%, of the length of first reaction zone 312 (left to right in FIG. 7)). When walls 302/303 are separate walls, a gap 305 between the first and second walls 302/303 may provide for a flow of the drivenflow 680 of bed solids from the combustion stage 330/second reaction zone 332 past bedwall 303, through gap 305, through opening 304, into the volatilization stage 310/first reaction zone 312. The gap may include a region having the gas phase of one zone (e.g., combustion stage) and the fluidization gas of the other zone (e.g., the volatilization stage), and so the size of the gap may be minimized according to an expected flow rate of drivenflow. A vertical distance from a lower edge 302' of gaswall 302 to the gas inlet below is typically less than the bed height 713, including 30%-95%, including 40-90%, including 50-80% of the bed height. A typical bed height may be 40-60, including 50-55 cm. A vertical distance from a lower edge 302' of gaswall 302 to the gas inlet below may be from 20-50, including form 30-40 cm.

Gas inlet 314 at the bottom of the bed in first reaction zone 312 may be coupled to a LowOx gas supply and configured to deliver a first LowOx (relatively less oxidizing/inert) gas to fluidize the bed solids in the first reaction zone 312 for use of this stage as a volatilization stage. Gas inlet 334 may be an oxidant inlet 334 at the bottom of the bed in the second reaction zone 332 that is coupled to a HiOx gas supply and configured to deliver a second HiOx gas that is relatively more oxidizing than the LowOx gas to fluidize the bed of bed solids in the second reaction zone, which may be operated as a combustion stage. For example, the LowOx gas might be steam, syngas, N2, and/or CO2, and the HiOx gas might be CO2, air and/or oxygen. In FIG. 7, gas inlet 314 (e.g., with a less oxidizing gas) extends beneath gap 305, and the ambient above gap 305 includes the combustion stage 330 (having a more oxidizing gas). Solids may flow through gap 305 while the gas inlets 314/334 and corresponding gases of stages 310/330 remain separated.

Splashgenerator 714 imparts a localized directed momentum to the bed solids in the second reaction zone 332 to create a drivenflow 680 of solids past bedwall 303 into first reaction zone 312, driving solids from the combustion stage to the volatilization stage. In this example, splashgenerator 714 is configured to generate a momentum that is at least partially horizontal, in this case angled toward the top of bedwall 303. The momentum may be directed away from an opening below a gaswall (e.g., an opening on the same side of the bedwall as the splashgenerator). A splashgenerator may comprise angled jets configured to inject high velocity gas toward the top of the wall. A splashgenerator may inject a transport gas that is more or less oxidizing than that delivered by gas inlet 314, which may be the same or different as that delivered by oxidant inlet 334. The transport gas may include flue gas and/or steam.

A height 710 of bedwall 303 may be higher than the expected fluidized height of at least the second reaction zone 312' (typically both zones 312/312') to prevent solids flow over the wall during normal fluidization. Height 710 may be below 90%, below 80%, including below 50% of the bed heights of both zones 312/312'. Bedwall 303 typically allows gaseous communication above the beds between the zones.

An exemplary BFB reactor may have a stagnant bed height from 30-100 cm, including 40-70 cm, including from 50-60 cm. Fluidization by the gas inlet typically increases a fluidized bed height of the "fluidized" solids by 40-80%, including about 50-70%, over the stagnant bed height. Height 710 of bedwall 303 may be accordingly chosen to prevent substantial solids flow under normal fluidization conditions. Height 710 of bedwall 303 may be at least 140% of the expected stagnant bed height, including at least 150%, including at least 160%. For particularly energetic splash generators, height 210 may be 2× the expected stagnant bed height, including at least 3×, including at least 4×. For some reactors (e.g., with highly varying fuel particle sizes), a more energetic splashgenerator may reduce fuel segregation (e.g., ensuring large chunks of fuel pass over bedwall 303). A less energetic splashgenerator may ensure that larger chunks remain in the first reaction zone until they are small enough to pass to the second reaction zone.

FIG. 8 illustrates a reactor 800 in which a combustion stage 330 receives drivenflow from a volatilization stage 310, which may be advantageous when the volatilization gas carried with the drivenflow is less harmful to the combustion stage than combustion gas to the volatilization stage. In this example, a substantially vertical splashgenerator 814 is on the opposite side of bedwall 303 than the oxidant inlet 334, and (in this case) adjacent to LowOx gas inlet 314. The walls are separated by a distance 307 to form a transport chamber 809, with the splashgenerator disposed between the walls. Distance 307 is typically at least 10% of bed height and less than 3x, including less than 2x, including less than bed height, including less than 50% of bed height.

A transport chamber may comprise a bedwall 303, a gaswall 302, and a splashgenerator 514, 714, 814 disposed between the walls. The splashgenerator may create a splashzone 560 (FIG. 5) that causes a drivenflow 680 to flow through a gap 305 between the walls 302, 303. By locating the splashgenerator between the walls, and imparting a splash momentum away from an opening 304 (FIG. 7) below the gas wall 302, the drivenflow may (almost hermetically) "pull" bed solids past the gaswall (from one zone) then entrain the solids to spray past the bedwall (into the other zone). A transport chamber may be used to impart a strong, directed flow from one portion of the bed to another portion.

By locating the splashgenerator between the walls of the transport chamber, splash energy may be focused and enhanced for long-range transport (rather than short-range dispersion or convection). In this example, a bottom of the transport chamber 809 comprises the gas inlet of one stage (e.g., volatilization) beneath the atmosphere of the other stage (e.g., combustion). Drivenflow 680 transfers solids through gap 305 while the gas phases on either side of gaswall 302 remain separated. The splash-containment of a transport chamber may enable the use of reversing or non-directing nozzles, which may improve sand-tolerance of the nozzles.

In this example, an optional baffle 870 substantially above the splashgenerator directs drivenflow toward the combustion stage, which may be advantageous for particularly high velocity splashes that "spray" through the top of the bed (e.g., to a height that is at least 50% above the normally fluidized bed height, including 100%, including at least twice the normally fluidized bed height). A baffle may extend from a gaswall into the combustion stage, particularly at an upward angle or downward angle with respect to drivenflow direction. A baffle may have a trailing edge that constrains the transport chamber, leading to acceleration of the drivenflow (e.g., a "jet" effect).

A reactor may include a buffer distance 308 between the splashgenerator and the gaswall 302, which may be used to reduce the in-bed splashing "backwards" into the volatilization stage 310. Buffer distance 308 may include a non-fluidized region at the bottom of the container and/or a passage gas inlet (e.g., at low fluidization velocity) to increase local bed density between the splashgenerator and opening 304 (FIG. 3A). A buffer distance 308 may be 35-65%, including 40-55% of a distance 307 between walls. A buffer distance may be at least 5%, including least 20%, including at least 40%, including at least 60% of a height of the lower edge 302' above the relevant (e.g., LowOx) gas inlet 314.

Various features described herein may be implemented independently and/or in combination with each other. An explicit combination of features does not preclude the omission of any of these features from other embodiments. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The invention claimed is:

1. A fuel stream processing system comprising:
a volatilization reactor comprising a bubbling fluidized bed configured to volatilize a fuel in a fluidized bed of bed solids using an inert, reducing, and/or mildly oxidizing gas to yield a volatiles stream, the volatilization reactor further comprising:
a gaswall separating at least a gas phase above the bed of bed solids into:
a volatilization stage comprising:
a fuel inlet configured to receive the fuel;
a first gas inlet configured to fluidize the bed of bed solids with a first gas to volatize the fuel to yield the volatiles stream;
a volatiles stream outlet; and
a volatiles pressure gauge configured to measure within the volatilization stage; and
a combustion stage comprising:
a second gas inlet configured to fluidize the bed of bed solids with a second gas that is more oxidizing than the first gas to yield an exhaust gas;
an exhaust gas outlet configured to convey the exhaust gas out of the combustion state; and
a combustion pressure gauge configured to measure pressure within the combustion stage;
an opening through and/or below the wall and below a surface of the bed solids, the opening configured to provide for a flow of bed solids between the volatilization stage and the combustion stage; and
a controller coupled to the pressure gauges and configured to control a pressure difference between the stages);
a separator including:
an inlet coupled to the volatiles stream outlet and configured to receive the volatiles stream;
at least one of a scrubber and a heat exchanger coupled to the inlet and configured to:
quench the volatiles stream to yield a gaseous phase and a condensate; and
separate the gaseous phase from the condensate;
a decanter coupled to the at least one of a scrubber and a heat exchanger and configured to:
receive the condensate; and
separate the condensate into a condensed organic phase and an aqueous phase;
a gas outlet configured to convey the gaseous phase from the separator;
a condensed fuel outlet configured to convey the condensed organic phase from the separator; and
a pyroprocessing apparatus coupled to at least one of the gas outlet and the condensed fuel outlet and configured to combust at least one of the gaseous phase and the condensed organic phase to fire a substance.

2. The system of claim 1, further comprising a demister coupled to the at least one of a scrubber and a heat exchanger, the demister configured to remove aerosols from the gaseous phase.

3. The system of claim 1, wherein the at least one of a scrubber and a heat exchanger comprises the scrubber, and the system further comprises a condensed fuel heat exchanger coupled to the decanter and configured to:
cool at least a portion of the condensed organic phase to form a quench liquid; and
deliver the quench liquid to the scrubber.

4. The system of claim 1, wherein the pyroprocessing apparatus is coupled to the gas outlet and the condensed fuel outlet, and the system further comprises a meter configured to control a ratio of the gaseous phase to the condensed organic phase combusted by the pyroprocessing apparatus.

5. The system of claim 4, wherein the pyroprocessing apparatus further comprises a furnace.

6. The system of claim 1, wherein the reactor further comprises at least one of a fixed bed gasifier, and an entrained flow gasifier.

7. The system of claim 1, further comprising an oxygen enrichment system configured to enrich an oxygen concentration in air, the oxygen enrichment system coupled to the pyroprocessing apparatus and configured to supply oxygen enriched air and/or substantially pure oxygen to the pyroprocessing apparatus.

8. The system of claim 1, wherein the reactor further comprises a circulating fluidized bed reactor.

9. The system of claim 1, wherein the pyroprocessing apparatus comprises a kiln disposed as a component of a cement making process.

10. The system of claim 1, wherein the pyroprocessing apparatus is disposed in a steelmaking process.

11. The method of claim 1, wherein the pyroprocessing apparatus comprises a kiln and the substance comprises $CaCO_3$.

12. The system of claim 1, further comprising an inlet heat exchanger coupled to the inlet of the separator and configured to exchange heat between the volatiles stream and the gaseous phase.

13. The system of claim 1, further comprising a filter and/or a cyclone coupled to the inlet of the separator and configured to remove particles from the volatiles stream to yield a filtered stream.

14. The system of claim 13, wherein:
the at least one of a scrubber and a heat exchanger comprises the scrubber and the heat exchanger;
the heat exchanger is disposed downstream of the filter and/or cyclone; and
the heat exchanger is disposed upstream of the scrubber, and is configured to cool the filtered stream prior to the scrubber.

15. The system of claim 14, wherein the heat exchanger coupled to the scrubber comprises:
a heavy tar outlet configured to deliver condensed fuel from the heat exchanger to the condensed fuel outlet; and
a gaseous outlet configured to deliver gaseous fuel from the heat exchanger to at least one of the scrubber and a demister.

16. The system of claim 1, further comprising a demister coupled to the at least one of a scrubber and a heat exchanger, the demister configured to at least partially remove aerosols from the gaseous phase.

17. The system of claim 1, wherein:
the scrubber and/or heat exchanger comprises the scrubber; and
the system further comprises a tar heat exchanger coupled to the decanter and configured to:
receive at least a portion of the condensed organic phase from the decanter;
cool the received condensed organic phase to form a quench liquid; and
deliver the quench liquid to the scrubber.

18. The system of claim 1, wherein the pyroprocessing apparatus further comprises a smelter.

19. A method for upgrading a fuel stream, the method comprising:
receiving a fuel;
volatilizing the fuel (101) in volatilization reactor with an inert, reducing, and/or mildly oxidizing gas to yield a volatiles stream, the volatilization reactor comprising:
a bubbling fluidized bed of bed solids;
a gaswall separating at least a gas phase above the bed of bed solids into:
a volatilization stage comprising:
a fuel inlet configured to receive the fuel;
a first gas inlet configured to fluidize the bed of bed solids with a first gas to volatilize the fuel to yield the volatiles stream; and;
a volatiles stream outlet; and
a combustion stage comprising:
a second gas inlet configured to fluidize the bed of bed solids with a second gas that is more oxidizing than the first gas to yield an exhaust gas;
an exhaust gas outlet configured to convey the exhaust gas out of the combustion stage; and
an opening through and/or below the wall and below a surface of the bed solids, the opening configured to provide for a flow of bed solids between the volatilization stage and the combustion stage;
quenching the volatiles stream to yield a gaseous phase and a condensate;
separating the gaseous phase from a condensate;
decanting the condensate into a condensed organic phase and an aqueous phase;
delivering an upgraded fuel stream comprising at least one of the gaseous phase and the condensed organic phase to a polyprocessing apparatus; and
combusting the upgraded fuel stream in the polyprocessing apparatus to fire a substance.

* * * * *